(12) United States Patent
Buscheck et al.

(10) Patent No.: US 11,137,169 B2
(45) Date of Patent: Oct. 5, 2021

(54) MULTI-FLUID, EARTH BATTERY ENERGY SYSTEMS AND METHODS

(71) Applicant: Lawrence Livermore National Security, LLC, Livermore, CA (US)

(72) Inventors: Thomas A. Buscheck, Pleasanton, CA (US); Ravindra Shrikrishna Upadhye, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 97 days.

(21) Appl. No.: 16/711,288

(22) Filed: Dec. 11, 2019

(65) Prior Publication Data

US 2020/0173692 A1 Jun. 4, 2020

Related U.S. Application Data

(63) Continuation-in-part of application No. PCT/US2019/022416, filed on Mar. 15, 2019.
(Continued)

(51) Int. Cl.
*F24T 10/20* (2018.01)
*F03G 7/04* (2006.01)
(Continued)

(52) U.S. Cl.
CPC .............. *F24T 10/20* (2018.05); *F01K 27/00* (2013.01); *F03G 7/04* (2013.01); *F03G 7/06* (2013.01);
(Continued)

(58) Field of Classification Search
USPC .................................. 165/45; 166/272.1, 52
See application file for complete search history.

(56) References Cited

U.S. PATENT DOCUMENTS 4,357,802 A 11/1982 Wahl, III et al.
6,244,341 B1 6/2001 Miller
(Continued)

FOREIGN PATENT DOCUMENTS

EP 2703607 A1 3/2014
JP 2002206704 A 7/2002

OTHER PUBLICATIONS

International Search Report and Written Opinion regarding International Application No. PCT/US2020/064495, dated May 3, 2021.

*Primary Examiner* — Patrick Hamo
*Assistant Examiner* — Wesley G Harris
(74) *Attorney, Agent, or Firm* — Harness, Dickey & Pierce, P.L.C.

(57) ABSTRACT

The present disclosure relates to a method for storing excess energy from at least one energy producing source, as thermal energy, using an existing geologic formation. First and second storage zones formed in a geologic region may be used to store high temperature and medium high temperature brine. When excess energy is available from the energy producing source, a quantity of the medium high temperature brine is withdrawn and heated using the energy supplied by the energy source to form a first new quantity of high temperature brine, which is then injected back into the first storage zone. This forces a quantity of medium high temperature brine present in the first storage zone into the second storage zone, to maintain a desired quantity of high temperature brine in the first storage zone and a desired quantity of medium high temperature brine in the second storage zone.

27 Claims, 15 Drawing Sheets

Related U.S. Application Data

(60) Provisional application No. 62/644,064, filed on Mar. 16, 2018.

(51) Int. Cl.
*F03G 7/06* (2006.01)
*F28D 20/00* (2006.01)
*H01M 6/34* (2006.01)
*F01K 27/00* (2006.01)

(52) U.S. Cl.
CPC .......... *F28D 20/0052* (2013.01); *H01M 6/34* (2013.01); *Y02E 20/16* (2013.01); *Y02E 60/14* (2013.01)

(56) References Cited

U.S. PATENT DOCUMENTS

| | | |
|---|---|---|
| 6,389,995 B1 | 5/2002 | Adams et al. |
| 9,181,930 B2 | 11/2015 | Klemencic |
| 2008/0134681 A1 | 6/2008 | Nayef et al. |
| 2008/0275278 A1 | 11/2008 | Clark |
| 2010/0071366 A1* | 3/2010 | Klemencic ................ F03G 7/04 60/641.2 |
| 2013/0056171 A1* | 3/2013 | Klemencic ................ F03G 7/04 165/45 |
| 2014/0238672 A1 | 8/2014 | Buscheck |
| 2016/0177697 A1 | 6/2016 | Looijer et al. |
| 2017/0299226 A1 | 10/2017 | Buscheck |

\* cited by examiner

MULTI-FLUID, EARTH BATTERY ENERGY SYSTEMS AND METHODS

CROSS-REFERENCE TO RELATED APPLICATIONS

This is a continuation-in-part application, which claims priority to PCT/US2019/022416, filed Mar. 15, 2019, which claims the benefit of U.S. Provisional Application No. 62/644,064, filed on Mar. 16, 2018. The entire disclosures of the above applications are incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to energy storage systems and methods, and more particularly to systems and methods for storing energy, and in some instances excess energy, in permeable geologic formations using compressed non-aqueous fluids and pressurized heated aqueous fluids, as well as using heated sand-filled or rock-filled reservoirs to augment operation of an earth-based energy storage/production system.

BACKGROUND

The statements in this section merely provide background information related to the present disclosure and may not constitute prior art.

Limiting global warming requires new measures enabling increased use of renewable and low-carbon energy, along with reducing greenhouse gas (GHG) emissions from fossil energy use. Fossil energy systems, integrated with $CO_2$-capture, use, and storage (CCUS), directly reduces GHG emissions, but current CCUS options lack a business case to justify $CO_2$-capture costs. The high capital cost of low-carbon, high-efficiency power requires running at full capacity for economic viability. Current energy-storage options, primarily deployed above-ground, lack the capacity to address both diurnal and seasonal supply/demand mismatches driven by variable renewable energy (VRE), while getting full value from high-efficiency, low-carbon power. Below-ground concepts, such as compressed air energy storage (CAES), offer greater storage capacity.

Energy-storage technologies often have high fabrication cost and can have a large above-ground (surface) footprint. Even those with the greatest storage capacity and duration, CAES and pumped hydro energy storage (PHES), cannot address seasonal energy storage. In addition, CAES in salt caverns and PHES require specific geographic conditions that limit their deployment opportunities.

It will also be appreciated that cost-effective reductions in greenhouse gas (GHG) emissions are best achieved when all low-carbon energy resources are fully utilized. This includes baseload power: nuclear energy (NE) and fossil energy (FE), integrated with $CO_2$-capture, use, and storage (CCUS), and variable renewable energy (VRE) (wind and solar). However, current CCUS options do not justify $CO_2$-capture costs and existing energy-storage approaches lack the capacity and storage duration needed to fully utilize all forms of low-carbon energy without curtailment.

Accordingly, challenges remain in further improving the capability of an Earth Battery system to optimize the utilization of available energy sources for the purpose of energy production. These improvements are also designed to substantially reduce the cost of $CO_2$-capture.

SUMMARY

This section provides a general summary of the disclosure and is not a comprehensive disclosure of its full scope or all of its features.

In one aspect the present disclosure relates to a method for storing excess energy from at least one energy producing source, as thermal energy, using an existing geologic formation. The method may comprise using a first storage zone formed in the geologic formation for storing high temperature brine having a temperature within a first temperature range, and using a second storage zone formed in the geologic formation adjacent the first zone for storing medium high temperature brine having a temperature within a second temperature range less than the first temperature range. When excess energy is available from the energy producing source, the method may provide for withdrawing a quantity of the medium high temperature brine and heating the withdrawn quantity of withdrawn medium high temperature brine using the excess energy to produce a first new quantity of high temperature brine and injecting the first new quantity of high temperature brine back into the first storage zone. The method may further provide for using the injection of the first new quantity of high temperature brine to force a quantity of medium high temperature brine present in the first storage zone into the second storage zone, to maintain a desired quantity of high temperature brine in the first storage zone and a desired quantity of medium high temperature brine in the second storage zone.

In another aspect the present disclosure relates to a method for storing excess energy from at least one energy producing source, as thermal energy using an existing geologic formation. The method may comprise using a first storage zone formed in the geologic formation for storing high temperature brine having a temperature within a first temperature range, and using a second storage zone formed in the geologic formation adjacent the first storage zone for storing medium high temperature brine having a temperature within a second temperature range less than the first temperature range. The method may further include using a third storage zone formed in the geologic formation adjacent the second storage zone for storing warm brine having a temperature with a third temperature range less than the second temperature range. When excess energy is available from the energy producing source, the method may provide for withdrawing a quantity of at least one of the warm brine or the medium high temperature brine, heating the withdrawn quantity of warm brine or the withdrawn quantity of medium high temperature brine using the excess energy to produce a first new quantity of high temperature brine, and injecting the first new quantity of high temperature brine back into the first storage zone. The method may further include using the injection of the first new quantity of high temperature brine to force a quantity of medium high temperature brine present in the first storage zone into the second storage zone, to maintain a desired quantity of high temperature brine in the first storage zone and a desired quantity of medium high temperature brine in the second storage zone.

In another aspect the present disclosure relates to a system for using storing excess energy from an energy producing source. The system may comprise at least one first well for withdrawing and injecting high temperature brine having a first temperature within a first temperature range into a first geologic storage zone. The system may further include at least one second well for withdrawing and injecting medium high temperature brine having a second temperature within a second temperature range less than said first temperature range into a second geologic storage zone adjacent the first geologic storage zone. The system may further include using a third plurality of wells to both withdraw warm brine and inject cool and/or warm brine into a third geologic storage zone adjacent the second geologic storage zone, with the warm brine and the cool brine having temperatures within a third temperature range less than the second temperature range. The system may also include a heat exchanger responsive to an excess energy from the energy producing source which heats a withdrawn quantity of the medium high temperature brine and/or a withdrawn quantity of the warm brine into a new quantity of high temperature brine. The system may also include a pump which injects the new quantity of high temperature brine into the first geologic storage zone.

In another aspect the present disclosure relates to an Earth battery system for storing at least one of excess electrical power from an electrical power grid, or heat from a heat generating source, in the form of pressure and heat, within the Earth, for future use in assisting with a production of electricity. The system may comprise at least one huff/puff well for injecting and withdrawing a compressed, supplemental, non-aqueous fluid, the non-aqueous fluid comprised of at least one of air, $CO_2$, $N_2$, or a mixture of $CO_2$ and $N_2$, in a first storage reservoir in the Earth. The system may further include at least one hot brine huff/puff well for injecting and withdrawing hot brine, heated using at least one of excess power from the electrical power grid and heat from a heat generating source, to and from a second storage reservoir in the Earth, at least at one of the same elevational level as the first storage reservoir or at a different elevational level than the first storage reservoir. The system may further include at least one cool brine huff/puff well for injecting and withdrawing cool brine to and from a third storage reservoir at a different elevational level than the first and second storage reservoirs, for pressure support needed to sustain the withdrawal of the at least one of the supplemental non-aqueous fluids and hot brine and for cooling the supplemental non-aqueous fluids in conjunction with an at least one compression stage. The system may further include at least one cool brine huff/puff well for injecting and withdrawing cool brine to and from the at least one of the first and second storage reservoirs, for the pressure management needed to sustain the injection and withdrawal of the at least one of the supplemental non-aqueous fluids and hot brine and for cooling the supplemental non-aqueous fluids in conjunction with an at least one compression stage. Still further, the system may use a power generating subsystem configured to use hot brine withdrawn from the second storage reservoir to pre-heat at least one of air, $CO_2$, $N_2$, or a mixture of $CO_2$ and $N_2$, withdrawn from the first reservoir, to drive a power generating component for generating electrical power back on to the electrical power grid upon demand.

In another aspect the present disclosure relates to a method for forming an Earth battery for storing at least one of excess electrical power from an electrical power grid, or heat from a heat generating source, in the form of pressure and heat, within the Earth, for future use in assisting with a production of electricity. The method may comprise using at least one huff/puff well for injecting and withdrawing a compressed, supplemental, non-aqueous fluid, the compressed, supplemental, non-aqueous fluid comprised of at least one of air, $CO_2$, $N_2$, or a mixture of $CO_2$ and $N_2$, in a first storage reservoir in the Earth. The method may further include using at least one hot brine huff/puff well for injecting and withdrawing hot brine, heated using at least one of excess power from the electrical power grid and heat from a heat generating source, to and from a second storage reservoir in the Earth, at least at one of the same elevational level as the first storage reservoir or at a different elevational level than the first storage reservoir. The method may further include using at least one of a cool brine huff/puff well for injecting and withdrawing cool brine to and from a third storage reservoir in the Earth, at a different elevational level than the first and second storage reservoirs, or cool brine imported from a separate brine source, for pressure support needed to sustain the withdrawal of at least one of the supplemental non-aqueous fluids and hot brine, and for cooling the supplemental non-aqueous fluids in conjunction with an at least one compression stage. The method may further include using at least one cool brine huff/puff well for injecting and withdrawing cool brine to and from the at least one of the first and second storage reservoirs, for the pressure management needed to sustain the injection of the at least one of the supplemental non-aqueous fluids and hot brine and for cooling the supplemental non-aqueous fluids in conjunction with an at least one compression stage. The method may further include using a power generating subsystem configured to use hot brine withdrawn from the second storage reservoir to pre-heat at least one of air, $CO_2$, $N_2$, or a mixture of $CO_2$ and $N_2$ withdrawn from the first reservoir, to drive a power generating component for generating electrical power back on to the electrical power grid upon demand.

The method for high- and very-high-temperature thermal energy storage (TES) in sand- or rock-filled tanks (called TES/HTX tanks, where HTX stands for heat exchanger) is added to all three Earth Battery versions. This high-/very-high-temperature heat can be derived from several sources, including electrical heaters and fossil energy (FE) combustion. These tanks can be placed above ground or partially or completely below ground.

The method for using pressurized hot brine or water to preheat boiler feedwater (BFW) in the Thermal Earth Battery. This hot brine or water is stored either above ground in tanks or below ground in porous reservoirs, as disclosed in Buscheck and Upadhye (2019b).

The method to directly use short- and long-term stored heat to provide the thermal energy required for $CO_2$-capture is added to all three Earth Battery versions. The parasitic cost of $CO_2$-capture is comprised primarily of heat (~90%), with the rest being electrical. This heat can be stored either above ground in tanks or below ground in porous reservoirs, as disclosed in Buscheck and Upadhye (2019b). This heat can be derived from several sources, including solar thermal energy (STE), the heat of air and/or $CO_2$ compression, and FE combustion. The use of excess energy to provide the energy required for $CO_2$-capture enables a significant portion of the electricity dispatched from an Earth Battery FE plant to be from renewable (wind and solar) energy sources, as well as from other very low-carbon energy sources, such as nuclear energy (NE). The direct use of stored heat in the amine-reboiler process utilizes that heat more efficiently than if it were used to generate electricity.

The method of using hot fluid recirculation to keep the combustors and pre-heaters in steam turbines hot enough to mitigate issues associated with thermal cycling. This method applies primarily to the Thermal Earth Battery.

The method of using booster heat exchangers is added between steam-turbine stages in the Thermal Earth Battery. These heat exchangers use medium-hot flue gas to boost the steam temperature between steam-turbine stages.

The method of using medium-hot flue gas leaving the pre-heater to supply some of the heat required for $CO_2$-capture.

The method of using some of the steam from the heat recovery steam generator (HRSG) to supply some of the heat required for $CO_2$-capture.

The method of using the heat of air compression from compressed air energy storage (CAES) to supply some of the heat required for $CO_2$-capture.

The method of using solar thermal energy (STE) to supply some of the heat required for $CO_2$-capture.

The method of using organic Rankine cycle turbines in the Thermal Earth Battery.

High-temperature TES/HTX tanks use electrical heaters to store heat powered by excess electricity from the grid or from a baseload power plant. Very-high-temperature TES/HTX/combustion tanks store heat generated by FE combustors that use bio-fuel, natural gas (NG), or coal. A key principal is to time-shift energy from when it is available to when it is demanded. High-/very-high-temperature TES/HTX tanks can time-shift VRE, NE power, and FE combustion so that it does not need to coincide with electricity demand. Time-shifting FE combustion can enable a constant stream of $CO_2$ in the exhaust flue gas, allowing the $CO_2$-capture system to run continuously at full capacity. This also allows the $CO_2$-capture system to be sized to the average electricity dispatch rate, rather than the peak dispatch rate, which would maximize the return on capital investment. Time-shifting FE combustion can also enable the parasitic load of $CO_2$-capture to be imposed during periods of over-supply, such as when VRE is abundant. Thus, otherwise wasted VRE and NE can be used to satisfy the energy requirements for $CO_2$-capture. Time-shifting $CO_2$-capture to periods of oversupply, increases net power from a FE plant during peak demand. High-/very-high-temperature TES/HTX tanks can also be used to increase peak power from FE power, enabling a dispatchable baseload plant to function as a peaker plant, without increasing $CO_2$ generation in real time. The addition of high-/very-high-temperature TES/HTX tanks to gas-turbine and combined-cycle power plants enables combustion heat to be generated 100% of the time at a constant rate, allowing $CO_2$-capture operations to run continuously at full capacity. This allows the $CO_2$-capture facility to be sized to the average electricity dispatch rate, rather than the peak dispatch rate, which would maximize the return on capital investment.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
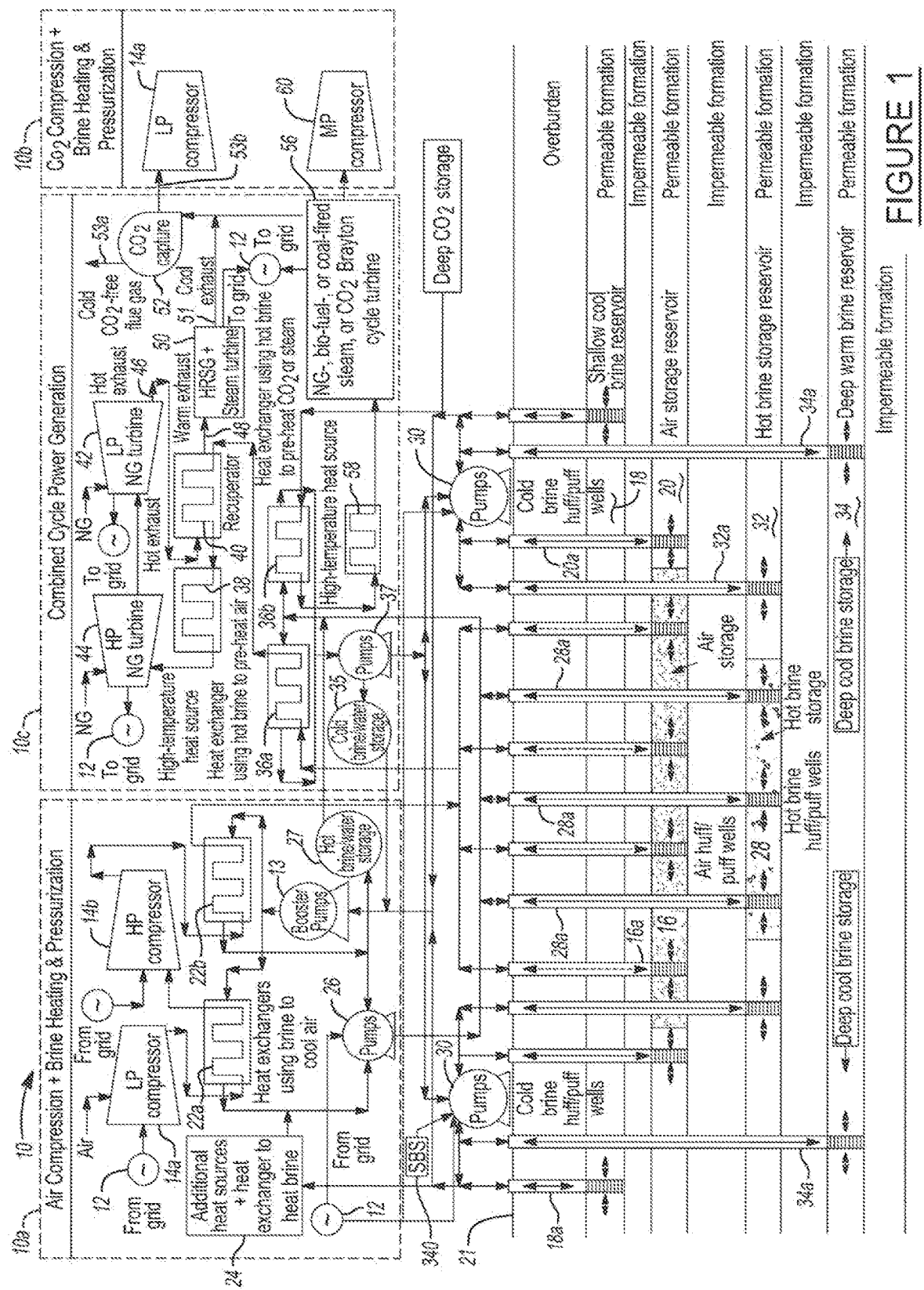
FIG. 1 is a high level block diagram illustrating one embodiment of the present disclosure relating to a multi-fluid, Earth Battery energy system, which can be called the CAES Earth Battery with Combined Cycle Power Generation, including recharging systems for air compression, plus brine heating and pressurization, and the discharging, power-generation system, with natural gas (NG) turbines, steam turbines, and $CO_2$ Brayton cycle turbines, pre-heated by stored hot brine. In the drawing Figures and following text, it will be noted that "Brayton cycle" has been used, but it will be understood that this may include Rankine cycle systems, such as the $CO_2$ Allam cycle.

The following description is merely exemplary in nature and is not intended to limit the present disclosure, application, or uses. It should be understood that throughout the drawings, corresponding reference numerals indicate like or corresponding parts and features.

Unlike pumped hydro energy storage (PHES), the systems and methods of the present disclosure require a permeable geologic formation, which is overlain by an impermeable geologic formation (also referred to as the "caprock"), and a surface power system having only a minimal surface footprint, compared to the subsurface storage aspects. The systems and methods disclosed herein are deployable in saline aquifers suitable for $CO_2$ storage that occur over half of the contiguous U.S. The systems and methods disclosed herein can also work in widespread hydrocarbon reservoirs, where resources and infrastructure can be leveraged to reduce cost and risk. Many geothermal reservoir systems are in low-to-medium temperature resources that limit power-conversion efficiency, using conventional systems and methods. Some saline aquifers and hydrocarbon reservoirs can be efficiently utilized by the systems and methods of the present disclosure as low- to medium-temperature geothermal resources, because those resources are used as a bottoming cycle before higher temperature thermal resources are used. Battery storage is associated with short operating lifetimes. Based on relevant well-field and power-system experience, operating lifetimes of the systems and methods disclosed herein may significantly exceed those of battery storage.

CAES Earth Battery and Combined-Cycle Power Generation

Figure 2:
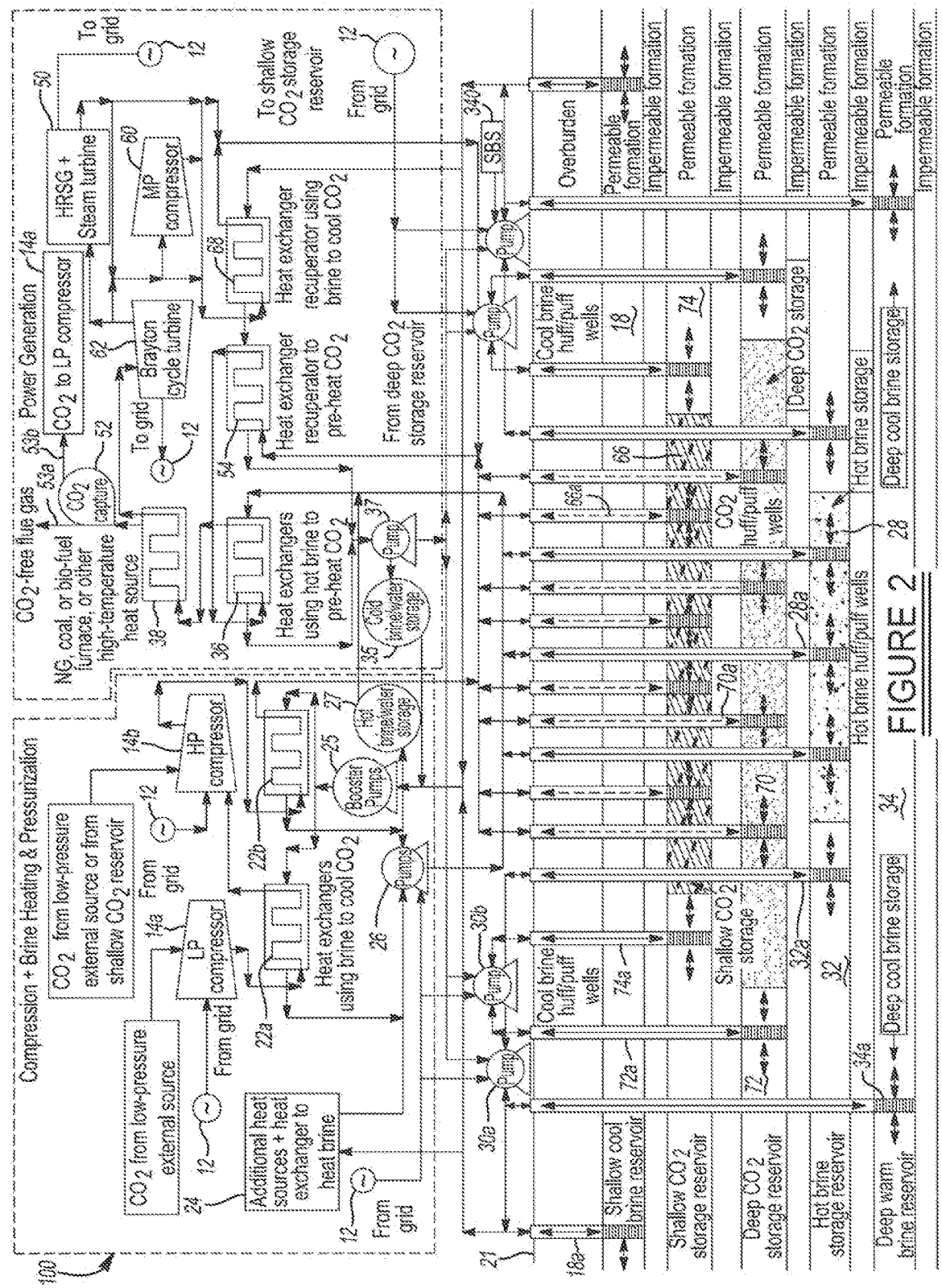
FIG. 2 is a high level block diagram showing another embodiment of the present disclosure relating to a $CO_2$ Earth Battery energy system, including a recharging system for $CO_2$ compression, plus brine heating and pressurization, and the discharging, power-generation system, with $CO_2$ Brayton cycle turbines and steam turbines, pre-heated by stored hot brine.

Referring to FIG. 1, an Earth Battery system 10 in accordance with one embodiment of the present disclosure is shown. More broadly, the Earth Battery system 10 is used to store excess electricity by using it to compress and store air and $CO_2$ in underground permeable reservoir formations (FIGS. 1 and 2). It will be understood that a reservoir formation can comprise either a geologic formation that has never been used in a reservoir operation or one that has been used in a reservoir operation. In the embodiment shown in FIG. 1, where it is used to store air underground, it is referred to as the CAES Earth Battery. The Earth Battery system 10 integrates conventional and renewable energy resources, allowing each resource to contribute more efficiently to an electric power grid than if operated independently of, or separately from, one another. The Earth Battery system 10 involves technology which makes use of existing technology that, when efficiently integrated, results in major, transformational advances for clean energy production and storage. To this end, the Earth Battery system 10 has a number of distinct advantages over previously developed systems which attempt to store energy using the Earth, some of which may be summarized as follows:

most of the wells used with the present disclosure may be termed "huff/puff" wells, which are used both for fluid injection and fluid production (also referred to as fluid withdrawal throughout this disclosure);

the heat of air, $N_2$, and $CO_2$ compression is used to heat formation brine, which is pressurized with excess electricity and stored in a reservoir;

when energy is needed, nonaqueous fluids (either air, $N_2$, $CO_2$, or mixtures of $N_2$ and $CO_2$) plus hot aqueous fluids (hot brine and/or hot water) are produced, with any of these nonaqueous fluids being pre-heated with hot aqueous fluids before, in the case of air, entering a either a NG turbine or an expander which does not include NG combustion, or, in the case of $N_2$ or $CO_2$ or mixtures of $N_2$ and $CO_2$, a coal-, bio-fuel-, or NG-fired Brayton cycle turbine, or a Brayton cycle turbine that does not include NG combustion (in the drawing Figures it will be noted that "$CO_2$" has been used, but it will be understood that this includes $CO_2$, $N_2$ or mixtures thereof);

the compressed air energy storage (CAES)/NG-turbine system can provide short-term (diurnal to several days) energy storage and the $N_2/CO_2$ Brayton cycle power system can provide combinations of short-term (diurnal to several days), medium-term (week-long), and long-term (seasonal) energy storage;

a steam turbine power system can also be used to provide combinations of short-term, medium-term, and long-term energy storage;

the Earth Battery system 10 can also store heat from other sources, such as baseload or solar thermal energy (STE) thermo-electric power when heat is not needed to generate electricity from those resources;

all heat sources are sequentially used (from low- to high-temperature) to pre-heat air, $N_2$, $CO_2$, or mixtures of $N_2$ and $CO_2$, providing a bottoming cycle for either an expander, a NG turbine, a coal-, bio-fuel-, or NG-fired $N_2/CO_2$ Brayton cycle turbine, or a coal-, bio-fuel-, or NG-fired steam turbine. Coal, bio-fuel, or NG may be used in a topping cycle, so their value is even greater than in conventional power systems;

all $CO_2$ from flue gas may be captured and stored in the reservoir, enabling zero-carbon operation;

besides on-site and imported NG, the Earth Battery system 10 can make use of bio-fuel for the topping cycle, adding a bioenergy (BE), $CO_2$-capture and storage (BECCS) operation, resulting in negative $CO_2$ emissions;

$CO_2$ can be imported to increase $CO_2$ and energy-storage capacity; $CO_2$ may also be stored at different depths underground to create a potential energy difference, similar to pumped hydro energy storage (PHES); but unlike PHES, the Earth Battery system 10 forms a subsurface approach which has a minimal surface footprint, compared to the subsurface storage aspects of the Earth Battery; and while the Earth Battery system 10 can use two or more permeable reservoir formations, with each overlain by an impermeable caprock formation, it can also be deployed in just one permeable reservoir formation overlain by an impermeable caprock if huff/puff wells are used for a three-cycle process of thermal recharge, supplemental, non-aqueous fluid (air, $N_2$, $CO_2$, or mixtures of $N_2$ and $CO_2$) recharge, and energy discharge. Furthermore, it will be appreciated that any reference herein to an aqueous fluid shall encompass brine, or combinations of brine and fresh water, or fresh water.

Referring further to FIG. 1, the Earth Battery system 10 thus forms a combined-cycle CAES Earth Battery which is able to receive excess electricity from an electric power grid 12. The system 10 may be viewed as including an air compression and brine heating and pressurization subsystem 10a, a $CO_2$ compression and brine heating and pressurization subsystem 10b, and a combined-cycle power generation subsystem 10c. The system 10 may use the excess electricity to compress air in one or more compression stages 14a,14b, with the compressed air being injected, using one or more huff/puff wells 16a, into a permeable reservoir formation 20 which forms an air storage zone 16. As is well known, the compression of air causes its temperature to rise. For efficient compression, air should be cooled after each compression stage. For cooling purposes, cool brine may be produced using one or more huff/puff wells 18a, from shallow permeable reservoir formations 18 below a ground surface 21, and/or deeper permeable reservoir formations 20,32,34 via one or more pluralities of huff/puff wells 20a, 32a and 34a, respectively. Cool brine can also be imported from an SBS ("separate brine source") 340, which can comprise at least one of a separate geologic formation or a separate brine reservoir, including man-made structures. It will be understood what is meant by "cool" brine is brine at an ambient temperature from where it was produced underground, which is called "cool" brine because it is cooler than stored hot brine. In this disclosure we also call this ambient-temperature brine "warm" brine because it is derived from geologic formations that are typically warmer than room-temperature water and can be useful in pre-heating room-temperature fluids, such as boiler feedwater. The use of a shallow permeable reservoir formation may be particularly useful where such formations contain fresh water and where fresh water resources are abundant. Initially, the extraction of brine or fresh water may require down-hole pumps in the wells to extract the brine or fresh water, but eventually these permeable formations will become sufficiently overpressured with the storage of either air, cool brine, or hot brine to cause the cool brine to flow to the ground surface 21 under artesian conditions. The cool brine, or cool fresh water if it is available, may be put through heat exchangers 22a,22b that follow each compression stage. It should be noted that it may be necessary to use one or more booster pumps 13 so that the pressure of the cool brine is high enough to prevent the brine from flashing to steam when the cool brine is put through and heated in heat exchangers 22a,22b.

Figure 1A:
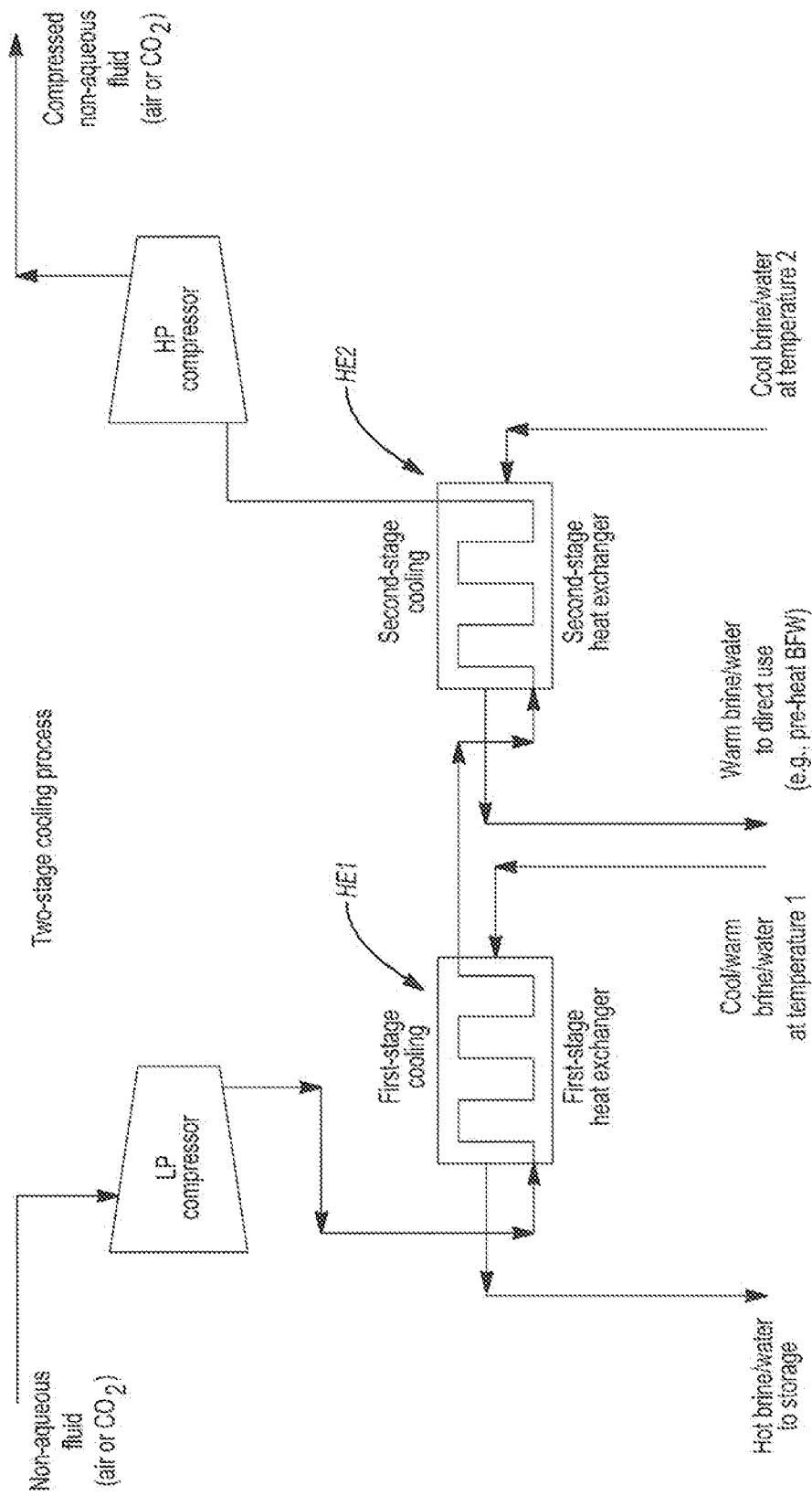
FIG. 1a is a high level block diagram illustrating one optional cooling subsystem that may be incorporated into the various embodiments described in the present disclosure, which involves a two-stage heat exchanger system in which water or brine at different temperatures may be used to help achieve the second stage cooling.

Following one or more compression stages, it is optional, but potentially desirable, to use a two-stage, air-cooling process that uses heat exchangers coupled in series, such as shown in FIG. 1a. In FIG. 1a, a first cooling stage, represented by a first stage heat exchanger HE1, and a second cooling stage, represented by a second stage heat exchanger HE2, are shown. Air (or even $CO_2$) is put through the first-stage heat exchanger HE1 where it is cooled by either cool or warm brine (as described above). The air that exits the first-stage heat exchanger HE1 may be put through the second-stage heat exchanger HE2 where it is cooled further. The additional cooling may be achieved using either cool water or brine having a temperature lower than the temperature of the cool or warm brine used in the first cooling stage with the first heat exchanger HE1. The two-stage cooling process improves the overall efficiency of the air-compression system. The two-stage cooling process also produces a stream of high-temperature brine, which may be pressurized and sent into storage, and a stream of medium-temperature water or brine, which can be used for some other purpose, such as pre-heating boiler feedwater in a steam-turbine power system in accordance with other embodiments of the present disclosure.

With further reference to FIG. 1, in addition to the heat of air compression, other sources of heat 24 may be used by our technology, such as from a baseload thermo-electric power plant when it is generating too much power for the demand on the electric power grid 12. Such power plants may include nuclear, coal-fired, NG-fired, bio-fuel-fired, or solar thermal energy. Other heat sources may include geothermal energy.

As air is cooled, brine, or fresh water, is heated in the heat exchangers 22a,22b. The heated brine may be pressurized using one or more pumps 26 so that the heated brine can be injected, using one or more huff/puff wells 28a, into an underground permeable reservoir formation which forms a hot brine, or hot water, storage zone 28. In addition to the option of storing pressurized hot brine or water underground in the hot brine storage zone 28, the hot brine or water, which was pressurized using pump 26, may be sent to one or more insulated, hot brine/water storage tanks 27, which is/are part of the two-tank, insulated, pressurized, aqueous fluid storage embodiment described later. Whether done underground or above-ground, this process enables the storage of energy as pressurized hot brine or pressurized hot water. For the following discussion, it will be appreciated that while cool brine or hot brine may be referenced, that fresh water (i.e., for example water of drinking quality) could also be used, and the following references to cool brine or hot brine are intended to encompass the uses of cool fresh water and hot fresh water as well.

Excess electricity from the grid 12 may be used to power one or more pumps 30 to pressurize cool brine produced from the shallow permeable reservoir formation 18 and/or the deeper 20,32 permeable reservoir formations, for injection into a deep permeable reservoir formation 32, or an even deeper permeable warm brine, reservoir formation 34, for the purpose of storing energy as pressurized cool brine. The use of huff/puff wells 18a,20a,32a,34a enables efficient recovery of the stored, pressurized energy.

When electricity is demanded by the grid 12, pressurized air is allowed to flow from the air storage zone 16 up to the ground surface 21, after which it enters heat exchangers 36a and 36b. To assist the upward flow of air, pressurized warm brine from the deep permeable reservoir formation 34 may be produced, using one or more huff/puff wells 34a, and allowed to flow under pressure, or be further pressurized (if necessary) by one or more pumps 30, so that it can be injected into the air storage reservoir 20, using one or more huff/puff wells 20a, which is/are just outside of the air storage zone 16. Thus, the warm brine acts like a piston, providing pressure support to sustain the upward flow of air. Pressurized hot brine is allowed to flow up one or more huff/puff wells 28a from the hot brine storage zone 28 up to the heat exchangers 36a,36b to heat the air. In addition, pressurized hot brine or hot water may be allowed to flow from the one or more insulated hot brine/water storage tanks 27 to the heat exchangers 36a,36b to heat the air. The cool brine leaving the heat exchangers 36a,36b is pressurized using one or more pumps 37 so it can be injected, using at least one of huff/puff wells 20a,32a, into the permeable reservoir formations 20,32 to provide pressure support to assist in the upward flow of air from the air storage zone 16 and the upward flow of hot brine from the hot brine storage zone 28. Some of the cool brine or cool water pressurized by pump 37 may also be sent to one or more cool brine/water storage tanks 35, which is/are part of the two-tank, insulated, pressurized, aqueous fluid storage embodiment described later. To further assist the upward flow of hot brine from the hot brine storage zone 28, pressurized warm brine from the deep permeable reservoir formation 34 may be produced, using one or more huff/puff wells 34a, and allowed to flow under pressure, or be further pressurized (if necessary) using one or more pumps 30, so that it can be injected into the hot brine storage reservoir 32, using one or more huff/puff wells 32a, which is/are just outside of the hot brine storage zone 28. Thus, warm brine acts like a piston, providing pressure support to sustain the flow of hot brine and to help prevent hot brine from flashing to steam. One such set of heat exchangers 38 may be heated by various above-ground high-temperature heat sources, such as from solar thermal energy. Still another set of heat exchangers 40 may form a "recuperative" set of heat exchangers and may be heated by the hot exhaust 46 from the final NG turbine 42. The heat-exchanger sequence in this example is from the lowest to the highest temperature heat source (i.e., from low-temperature heat exchanger 36 to medium-temperature heat exchanger 40 to high-temperature heat exchanger 38).

After the air exits one or more of the high-temperature heat exchangers 38, it enters a high-pressure NG turbine 44, or it may enter an expander (not shown) that does not include NG combustion. The air goes through one or more stages of the NG turbines 42 and/or 44, or expanders that do not include NG combustion, or an expander (not shown) that does not include NG combustion, which feeds one or more stages of the NG turbines. The NG turbines 42/44 and/or expanders may power generators that deliver electricity to the grid 12.

If NG turbines are used, hot exhaust flue gas 46 exiting the final NG turbine 42 enters the recuperator heat exchanger 40 that heats air prior to the air entering either the high-temperature heat exchanger 38, the NG turbine 44, or an expander that does not use NG combustion.

The warm exhaust flue gas 48 that exits the recuperator heat exchanger 40 may enter a heat recovery steam generator (HRSG) coupled to a steam turbine 50 to generate electricity for the grid 12. Cool exhaust flue gas 51 that exits the HRSG plus steam turbine 50 may enter a $CO_2$-capture system 52 that generates $CO_2$-free flue gas 53a and nearly pure $CO_2$ (53b). The captured $CO_2$ enters a low-pressure compressor 14a where it is compressed for storage. Details of the $CO_2$ compression and storage process are described in the following paragraphs for the $CO_2$ Earth Battery embodiment.

The $CO_2$ Brayton cycle turbine power system (components 56, 36b, 58, and 60) are described in greater detail in FIG. 2 and in the $CO_2$ Earth Battery embodiment.

$CO_2$ Earth Battery

Referring now to FIG. 2, a $CO_2$ Earth Battery system 100 is shown in FIG. 2. This embodiment makes use of certain of the same components as the system 10 of FIG. 1, and common components will be designated using the same reference numbers. The system 100 uses excess electricity from the grid 12 to compress $CO_2$ in one or more compression stages 14a,14b, with the compressed $CO_2$ being injected into a permeable reservoir formation 72 which forms a deep $CO_2$ storage zone 70, via one or more huff/puff wells 70a. The compression of $CO_2$ causes its temperature to rise. For efficient compression, $CO_2$ needs to be cooled after each compression stage. For cooling purposes, cool brine is produced, using one or more huff/puff wells 18a, from either the shallow permeable reservoir formation 18 or the deeper permeable reservoir formations 72,74, using at least one of huff/puff wells 72a,74a. Initially, this may require downhole pumps to extract the brine, but eventually these permeable formations will become sufficiently overpressured with the storage of either $CO_2$, cool brine, or hot brine to cause the cool brine to flow up to the ground surface 21 under artesian conditions. Cool brine can also be imported from an SBS ('separate brine source") 340, which can comprise at least one of a separate geologic formation or a separate brine reservoir, including man-made structures. The cool brine is put through heat exchangers 22a,22b that follow each compression stage. It should be noted that it may be necessary to use one or more booster pumps 25 so that the pressure of the cool brine is high enough to prevent the brine from flashing to steam when the cool brine is sent through and heated in heat exchangers 22a,22b. Following one or more compression stages, it may be possible to use a two-stage, $CO_2$-cooling process that uses heat exchangers coupled in series, such as describe above in connection with FIG. 1a. In the first cooling stage, $CO_2$ is put through the first-stage heat exchanger HE1 where it is cooled by either cool or warm brine (as described above). The $CO_2$ that exits the first-stage heat exchanger HE1 may be put through the second-stage heat exchanger HE2 where it is cooled further using either cool water or brine having a temperature lower than the temperature of the cool or warm brine used in the first cooling stage. The two-stage cooling process improves the overall efficiency of the $CO_2$-compression system, while producing a stream of high-temperature brine, which may be pressurized and sent into storage, and a stream of medium-temperature water or brine, which can be used for some other purpose, such as pre-heating boiler feedwater in a steam-turbine power system in accordance with other embodiments of the present disclosure.

In addition to the heat of $CO_2$ compression, other sources of heat 24 may be used, such as from a baseload thermoelectric power plant when it is generating too much power for the demand on the grid 12. Such power plants may include nuclear, coal-fired, NG-fired, bio-fuel-fired, or solar thermal energy. The other heat sources 24 may include geothermal energy. As $CO_2$ is cooled, brine is heated in the heat exchangers 22a,22b. The heated brine is pressurized using one or more pumps 26 so that it can be injected, using one or more huff/puff wells 28a, into a permeable reservoir formation which forms a hot brine storage zone 28. In addition to the option of storing pressurized hot brine or water underground in the hot brine storage zone 28, the hot brine or water, which was pressurized using pump 26, may be sent to one or more insulated, hot brine/water storage tanks 27, which is/are part of the two-tank, insulated, pressurized, aqueous fluid storage embodiment described later. Whether done underground or above-ground, this process enables the storage of energy as pressurized hot brine or pressurized hot water.

Excess electricity from the electric power grid 12 is used to power the pumps 30a,30b to pressurize cool brine produced from the shallow and/or deeper permeable reservoir formations 18 and 72,74, using at least one of huff/puff wells 18a,72a,74a, respectively, for injection into a deep permeable reservoir formation 32, using one or more huff/puff wells 32a, and/or into the even deeper permeable reservoir formation 34, using one or more huff/puff wells 34a for the purpose of storing energy as pressurized cool or warm brine.

When electricity is demanded by the electric power grid 12, pressurized $CO_2$ is allowed to flow from the deep $CO_2$ storage zone 70 up to the ground surface 21, via one or more huff/puff wells 70a, and into one or more heat exchangers 36, or possibly into one or more heat exchangers 54, before entering one or more heat exchangers 36, and then possibly into one or more heat exchangers 38 (as discussed below). The cool brine leaving the heat exchangers 36 is pressurized using one or more pumps 37 so it can be injected into the permeable reservoir formations 32,72, using at least one of huff/puff wells 32a,72a, to provide pressure support to assist in the upward flow of $CO_2$ from the $CO_2$ storage zone 70, via one or more huff/puff wells 70a, and the upward flow of hot brine from the hot brine storage zone 28, via one or more huff/puff wells 28a. Some of the cool brine or cool water pressurized by one or more pumps 37 may also be sent to one or more cool brine/water storage tanks 35, which is/are part of the two-tank, insulated, pressurized, aqueous fluid storage embodiment described later. To further assist the upward flow of $CO_2$, pressurized warm brine from the deep permeable reservoir formation 34 may be produced, using one or more huff/puff wells 34a, and allowed to flow under pressure, or be further pressurized (if necessary) by one or more pumps 30a, so that it can be injected into the deep $CO_2$ storage reservoir, via one or more huff/puff wells 72a, which is/are just outside the deep $CO_2$ storage zone 70. This causes the warm brine to act like a piston, providing pressure support to sustain the upward flow of $CO_2$, via one or more huff/puff wells 70a. To further assist the upward flow of hot brine, pressurized warm brine from the deep permeable reservoir formation 34 may be produced, using one or more huff/puff wells 34a, and allowed to flow under pressure, or be further pressurized (if necessary) using one or more pumps 30a, so that it can be injected into the hot brine storage reservoir 32, via one or more huff/puff wells 32a, which is/are just outside of the hot brine storage zone 28. Thus, warm brine acts like a piston, providing pressure support to sustain the upward flow of hot brine, via one or more huff/puff wells 28a, and to prevent hot brine from flashing to steam. Pressurized hot brine is allowed to flow from the hot brine storage zone 28, via one or more huff/puff wells 28a, up to the heat exchangers 36 to heat the $CO_2$. Heated $CO_2$ may flow into the additional series of heat exchangers 38,54. One such set or series of heat exchangers 38 may be heated by various above-ground high-temperature heat sources, such as from solar thermal energy. The other set of heat exchangers 54 may be heated by hot $CO_2$ after it has exited a medium-pressure compressor 60. The series of high-temperature heat exchangers 38 may also include NG-fired, coal-fired, and/or bio-fuel-fired furnaces. Thus, NG, coal, and/or bio-fuel combustion may be used in the final stages of temperature boosting before the heated $CO_2$ enters one or more Brayton cycle turbines 62. The heat-exchanger sequence is preferably always from the lowest to the highest temperature heat source.

If NG, coal, or bio-fuel is combusted to heat the $CO_2$, the $CO_2$ that was generated during combustion may be sent to a $CO_2$-capture system 52, which generates $CO_2$-free flue gas 53a and nearly pure $CO_2$ 53b, which is then sent to a low-pressure compressor 14a prior to storage in the shallow $CO_2$ storage zone 66.

After $CO_2$ is pre-heated by one or more heat exchanger stages 54,36,38 (from lowest to highest temperature) and exits the final stage, which is either the hot brine heat exchanger(s) 36 or the high-temperature heat exchanger(s) 38, it may enter one or more Brayton cycle turbines 62 to generate electricity for the electric power grid 12. Note that the high-temperature heat exchangers 38 may comprise a series of heat exchangers with successively higher heat sources (not expressly shown). If it is sufficiently hot after exiting the Brayton cycle turbine(s) 62, the $CO_2$ may be sent to the HRSG plus steam turbine 50 to generate electricity for the electric power grid 12. Depending on the depth of the shallow $CO_2$ storage zone 66, the $CO_2$ may be sent to the medium-pressure compressor 60. Depending on the temperature of the $CO_2$ exiting either the HRSG plus steam turbine 50 or the medium-pressure compressor 60, the $CO_2$ may be sent to one or more recuperator heat exchangers 68, where cool brine produced from either the shallow permeable reservoir formation 18 or the shallow permeable $CO_2$ storage reservoir formation 74 is used to cool the $CO_2$ prior to its storage in the shallow $CO_2$ storage zone 66, using one or more huff/puff wells 66a.

Brine that is heated in the recuperator heat exchangers 68 may be sent to the recuperator heat exchangers 54, where the heated brine may be used to pre-heat $CO_2$ produced from the deep $CO_2$ storage zone 70, prior to that $CO_2$ entering at least one of one or more heat exchangers 36 and one or more heat exchangers 38.

During periods of excess power supply, $CO_2$ may be produced from the shallow $CO_2$ storage zone 66, via one or more huff/puff wells 66a, and allowed to flow to the ground surface 21. From the ground surface 21 the $CO_2$ may continue on into the high-pressure compressor 14b. Excess electricity from the electric power grid 12 is used to compress the $CO_2$ for injection and storage in the deep $CO_2$ storage zone 70, using one or more huff/puff wells 70a. To assist the flow of $CO_2$ from the shallow $CO_2$ storage zone 66 to the deep $CO_2$ storage zone 70, pressurized cool brine may be allowed to flow under pressure from the deep $CO_2$ storage reservoir formation 72, via one or more huff/puff wells 72a, or cool or warm brine may be allowed to flow from the deep warm brine reservoir formation 34, via one or more huff/puff wells 34a, up to the surface 21, and then back down to the shallow $CO_2$ storage reservoir formation 74, via one or more huff/puff wells 74a. If further pressurization is needed, one or more pumps 30b may be used to pressurize the cool brine after it leaves either the deep $CO_2$ storage reservoir 72 or the deep warm brine reservoir 34, and before it enters the shallow $CO_2$ storage reservoir 74. Thus, stored cool or warm pressurized brine is used to function like a piston that provides pressure support, which reduces the power required to compress the $CO_2$, while moving it from the shallow $CO_2$ storage zone 66 to the deep $CO_2$ storage zone 70. It should be noted that it is far more efficient to pressurize brine than it is to compress $CO_2$.

Figure 3:
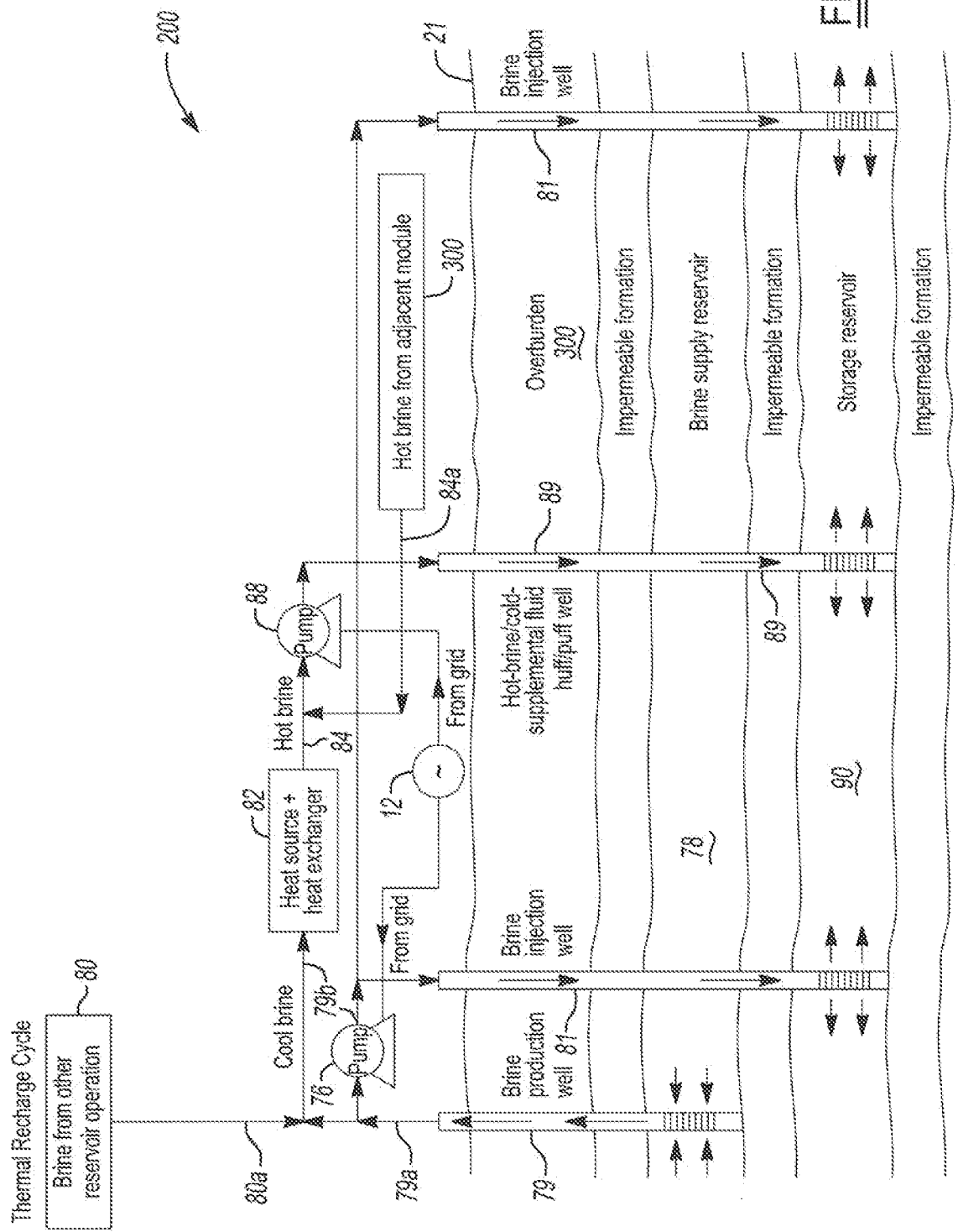
FIG. 3 is a high level diagram illustrating a thermal recharge cycle for the system of FIG. 1 and/or FIG. 2.

Multi-Use Huff/Puff Wells for Thermal and Supplemental, Non-Aqueous Fluid Recharge and Energy Discharge The present disclosure is able to utilize individual multi-use huff/puff wells for thermal recharge, supplemental, non-aqueous fluid recharge, and energy discharge. Referring to FIG. 3, a system 200 in accordance with another embodiment of the present disclosure is disclosed which implements thermal and supplemental, non-aqueous fluid recharge and energy discharge. Components in common with the systems 10 and 100 have been designated using the same reference numbers as those used to discuss the systems 10 and 100.

Excess electricity from the electric power grid 12 is used to power one or more pumps 76 that move cool brine 79a up through at least one brine production well 79 from at least one brine supply reservoir 78 and/or cool brine 80a from at least one separate reservoir operation 80, with one or more pumps 76 generating cool pressurized brine 79b, with is then sent into and through one or more brine injection wells 81, for use in the storage reservoir 90. Cool pressurized brine 79b may be fed to a heat exchanger 82, which uses a heat source to generate hot brine 84 for thermal energy storage. Hot brine 84a may also be brought in from at least one adjacent energy-storage module, which may comprise system 300 in FIG. 4, for thermal energy storage. Excess electricity from the electric power grid 12 is used to power one or more pumps 88 to pressurize the hot brine 84 (with or without hot brine 84a from an adjacent module) for injection into the storage reservoir 90 via at least one multi-use huff/puff well 89. Excess electricity from the electric power grid 12 may also be used to power one or more pumps 76 to inject cool pressurized brine 79b into one or more brine injection wells 81 for pressure support in the storage reservoir 90.

Supplemental, Non-Aqueous Fluid Recharge

Figure 4:
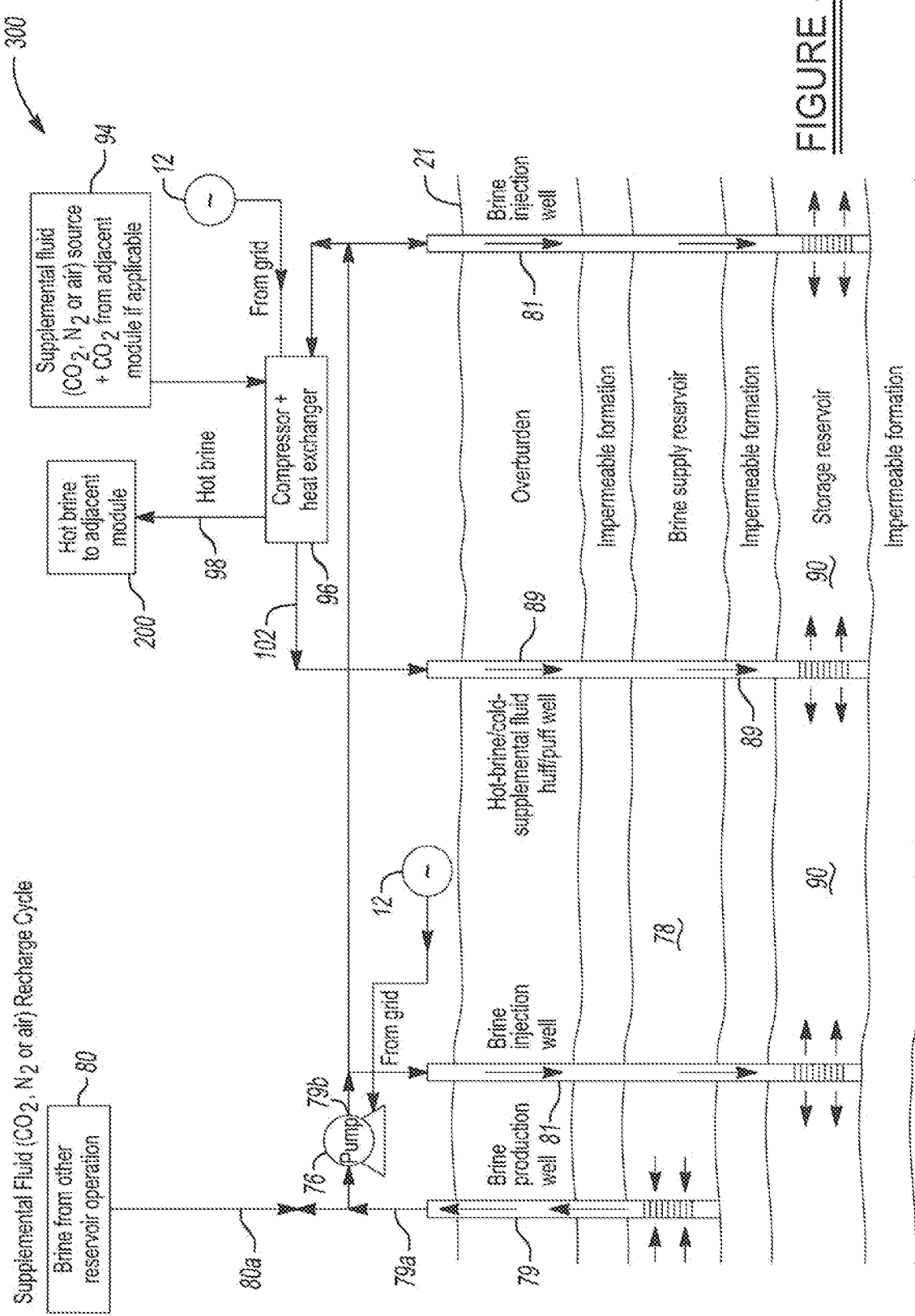
FIG. 4 is a high level diagram illustrating operations associated with a supplemental, non-aqueous fluid recharge cycle for the system shown in FIG. 1 and/or FIG. 2.

Referring to FIG. 4, a system 300 in accordance with another embodiment of the present disclosure is shown for performing supplemental, non-aqueous fluid recharging. Supplemental, non-aqueous fluid ($CO_2$, $N_2$, or air) is brought in from an external source 94, which is fed to a compressor and heat exchanger 96 powered with excess electricity from the electric power grid 12. Note that in the case of $CO_2$, the external source may be a $CO_2$ storage reservoir operated in conjunction with a geological $CO_2$ storage (GCS) operation. Excess electricity from the grid 12 is used to power one or more pumps 76 that move cool brine 79a from the brine supply reservoir 78 up through at least one brine production well 79, and/or cool brine 80a from at least one separate reservoir operation 80, with one or more pumps 76 generating cool pressurized brine 79b that is sent down through one or more brine injection wells 81 for use in the storage reservoir 90. Some of the cool brine 79a and/or 80a may also be put through one or more pumps 76 to generate cool pressurized brine 79b, which is used to cool compressed, supplemental, non-aqueous fluid flowing through the compressor and heat exchanger 96, which generates hot brine 98 and cooled, compressed, supplemental, non-aqueous fluid 102. The hot brine 98 may be sent to at least one adjacent energy-storage module, which may be system 200 discussed in connection with FIG. 3. It will be appreciated that a three-cycle system works especially well when deployed as two parallel modules. Thus, while module 300 is in cycle two, module 200 is in cycle one, and vice versa. The cooled, compressed, supplemental, non-aqueous fluid 102 may be injected into the storage reservoir 90, via at least one multi-use huff/puff well 89. Excess electricity from the electric power grid 12 may also be used to power the one or more pumps 76 to pressurize and inject cool brine 79b into one or more brine injection wells 81 to provide pressure support in the storage reservoir 90.

Energy Discharge System

Figure 5:
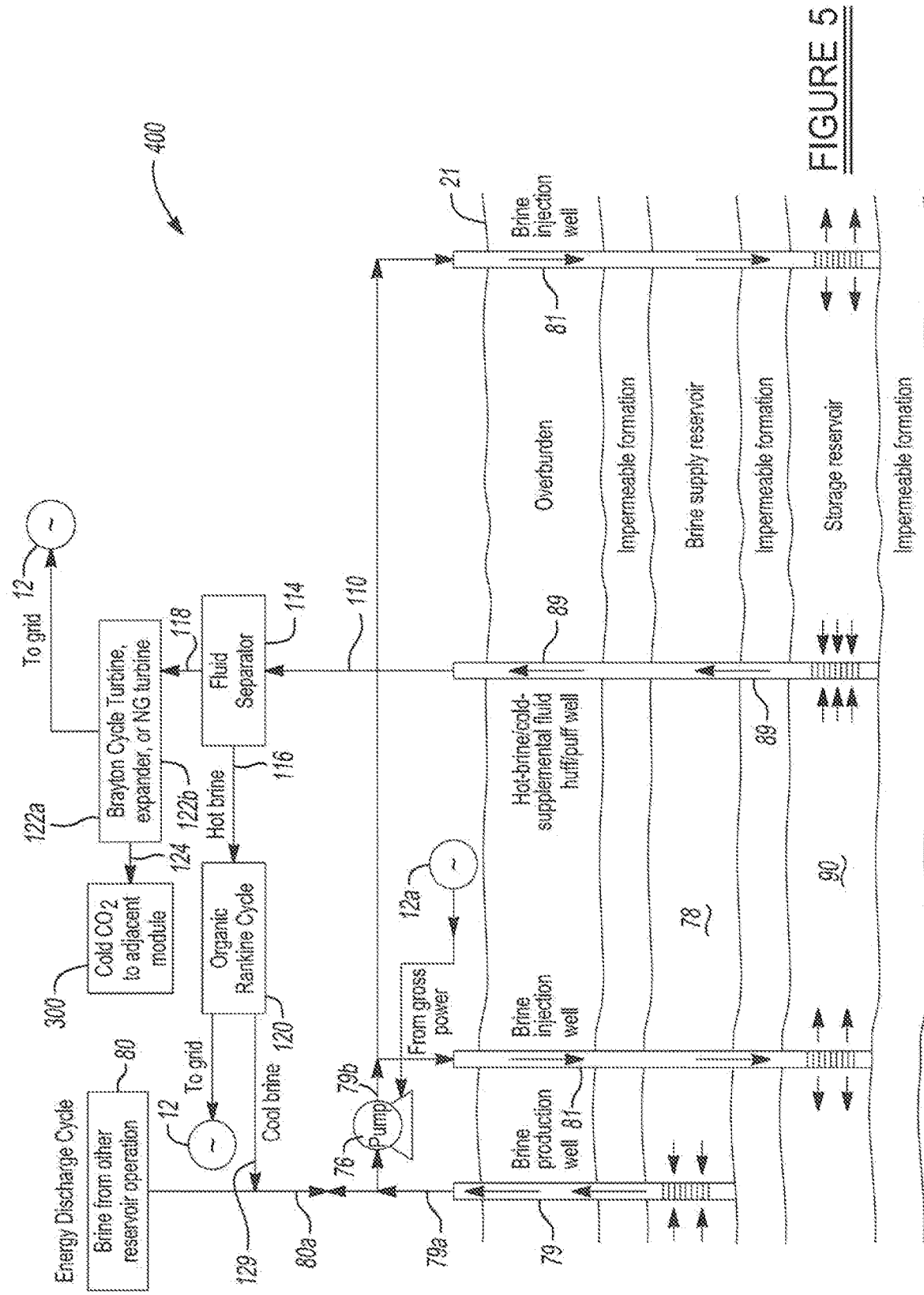
FIG. 5 is a high level diagram illustrating operations associated with an energy discharge cycle for the system shown in FIG. 1 and/or FIG. 2.

Referring to FIG. 5, an energy discharge system 400 is shown in accordance with still another embodiment of the present disclosure. The system 400 operates such that when electricity is needed, a mixture of pressurized fluids, including hot brine and hot, supplemental, non-aqueous fluid 110, is allowed to flow up at least one multi-use huff/puff well 89. The hot mixture of brine and supplemental non-aqueous fluid 110 is fed into a fluid separator 114 which separates hot brine 116 from hot, supplemental, non-aqueous fluid 118. The hot brine 116 may be fed to a conventional geothermal power system, such as an Organic Rankine Cycle system 120 or steam turbine system (not expressly shown), which generates electricity for the electric power grid 12. If the supplemental, non-aqueous fluid is $N_2$, $CO_2$, or a mixture of $N_2$ and $CO_2$, it may be fed to a Brayton cycle turbine 122a, which generates electricity for the grid 12. If the supplemental, non-aqueous fluid is air, it may be fed to an expander or to a NG turbine 122b, which generates electricity for the grid 12. If air is used, it may be exhausted to the atmosphere (not expressly shown). If $CO_2$ is used, cold $CO_2$ 124 may be sent to at least one adjacent energy-storage module, which may be system 300 in FIG. 4, for compression and storage or it may be sent to a GCS operation. Some of the gross generated electric power 12a may be used to power the one or more pumps 76 to move cool brine from at least one brine supply reservoir 78 via at least one brine production well 79, and/or cool brine 80a imported from at least one separate reservoir operation 80, and/or cool brine 129 from the conventional geothermal power system (i.e., Organic Rankin Cycle system 120). This cool brine 129 may be sent to one or more pumps 76 to generate cool pressurized brine that is injected into the storage reservoir 90 via one or more brine injection wells 81 to provide pressure support in the storage reservoir 90.

Two-Tank, Insulated, Pressurized, Aqueous Fluid Storage

Figure 6:
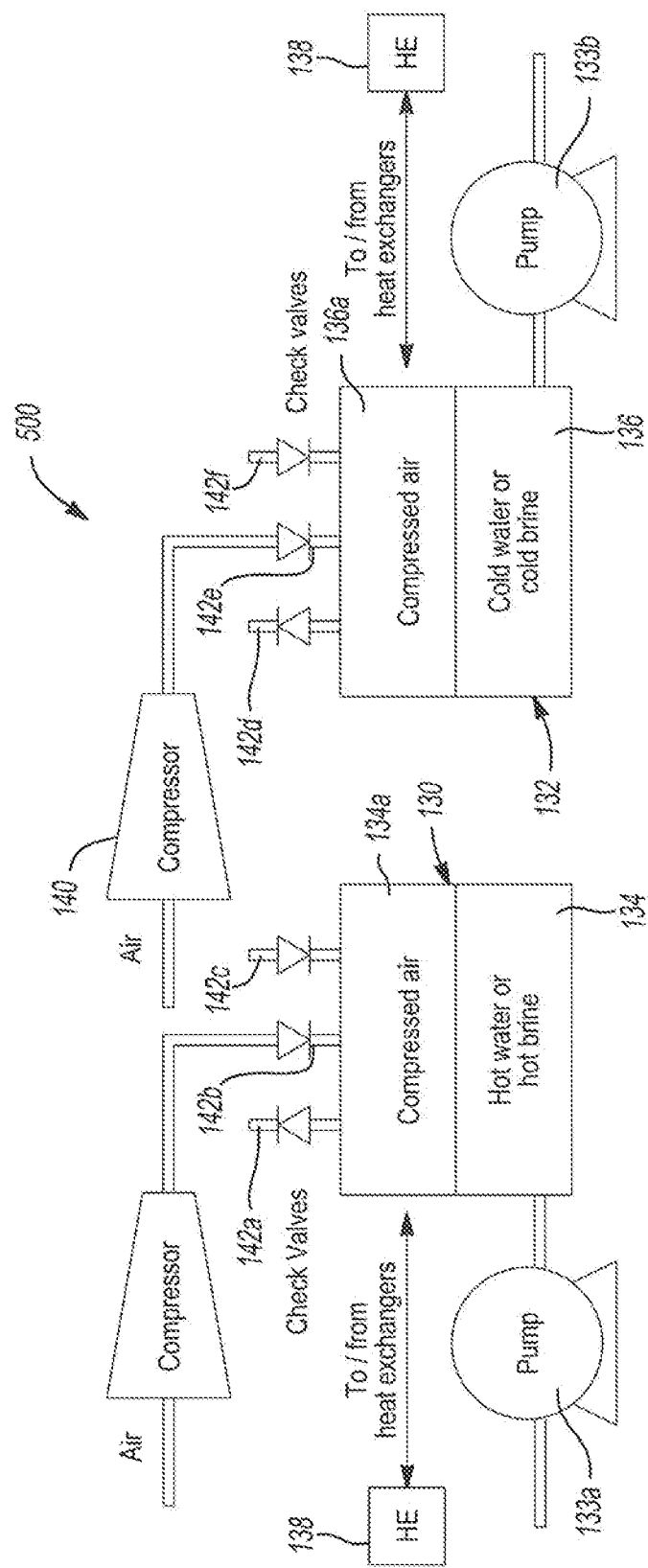
FIG. 6 shows another embodiment of the present disclosure relating to a two-tank, insulated, pressurized, hot aqueous fluid storage system.

Referring now to FIG. 6, a two-tank, insulated, pressurized aqueous fluid (water, brine, or mixtures thereof) storage system 500 in accordance with another embodiment of the present disclosure is shown. Components used in this embodiment which are in common with one or more previously described embodiments are denoted with the same reference numbers.

The system 500 makes use of a pair of insulated tanks, one being a hot tank 130 and one being a cool tank 132. (While the following description refers to water, it will be understood that this includes water, brine, or mixtures thereof.) The hot tank 130 may be used to store hot water 134 and the cool tank 132 may be used to store cool water 136. Both of the tanks 130 and 132 also serve to store their respective quantities of water under pressurization. It should be noted that these tanks may be located entirely above-ground, or they can be located either partially or fully underground. The high-temperature, pressurized water 134 may be fed to one or more heat exchangers 138, arranged in a loop, to transfer stored thermal energy from the hot water 134 to a supplemental, non-aqueous fluid (e.g., $CO_2$, $N_2$, or air). Each tank 130 and 132 is partially filled with pressurized water (i.e., either hot water 134 or cool water 136) and partially filled with quantities of compressed air 134a and 136a, respectively. To circulate fluids between the hot and cool storage tanks 130 and 132, and the heat exchangers 138, the pressure in the cool tank 132 needs to be close to that of the hot tank 130. One or more pumps 133a,133b do most of the work required to circulate water through the heat exchangers 138. Air compressor(s) 140 is/are operated to maintain adequate pressure to prevent the hot water 134 from flashing to steam. Check valves 142a-142f may be used to protect the tanks 130 and 132 from over or under pressurization.

Thermal Earth Battery

To even further augment the above-described Earth Battery system 10, additional new aspects of thermal energy storage (TES) can be used to form new Earth Battery energy systems which even further augment and enhance the capabilities of the Earth Battery system 10 described above. Such Earth Battery energy systems may be deployed using mature steam-turbine or compressed air energy storage (CAES) technologies, as well as with emerging $CO_2$ power technology. Because TES is the primary means of energy storage in this new form of the Earth Battery energy systems, we refer to our new system as the Thermal Earth Battery.

In this regard, the Thermal Earth Battery energy systems which will be discussed in the following paragraphs are designed to be highly flexibly, capable of being adapted to a wide range of thermo-electric power systems, including nuclear energy (NE), fossil fuel energy (FE) or solar thermal energy (STE) power systems, as well as combinations of such power systems. The underlying principal is to employ "time-shifting" techniques to enable full utilization of the heat generated by any given thermo-electric power system, such as STE. Thus, during those times when excess energy is being produced, for example when excess electricity is being produced, the excess heat is stored underground, and/or possibly above-ground, rather than being immediately converted to electricity and sent either to an electric power grid or to bulk energy storage, such as battery storage. It should be noted that battery storage is less efficient and more expensive than using TES to time-shift when heat is converted to electricity to correspond to when it is demanded. Time shifting when available heat is converted to electricity enables full utilization of the heat generated by any given thermo-electric power system, such as STE, without resorting to less efficient and more costly energy-storage means, such as battery storage.

In addition to time-shifting heat sources, the Thermal Earth Battery energy systems can also time-shift from when natural gas (NG) is available to when electricity that can be generated by NG combustion is required by an electric power grid. This is useful in regions, such as the Permian Basin, where NG that is co-produced with oil production often does not have a market, and because it can be costly to re-inject NG back into the hydrocarbon reservoir, NG may be flared off with no energy-resource benefit. Time-shifting the energy contained in NG to correspond to periods of energy demand enables better utilization of that energy resource and avoids wasteful flaring of that resource, with the flaring generating $CO_2$ with no energy-resource benefit. Because the Thermal Earth Battery energy systems include provisions to capture and geologically sequester the $CO_2$ generated by NG combustion, they can be deployed as a zero-carbon energy system.

For STE, which is an IRE source, as well as for baseload, thermo-electric power plants, one goal of the present disclosure is to store heat either underground or above-ground whenever energy supply exceeds demand. This approach aims to prevent STE from being wasted and to allow thermo-electric power plants (baseload in particular) to continuously generate heat at the full rated thermal capacity. The overarching goal is for heat generated by low-carbon, thermo-electric power resources to be converted to electricity only when demand exceeds energy supply. Another underlying principal is to efficiently sequence the utilization of heat sources in power generation, starting with the lowest-grade heat source, then progressing to successively higher-grade heat sources. By doing this, the highest-grade heat source, which can come from the combustion of FE, can be utilized with the greatest incremental value to generating power. This sequencing process also allows each heat source to be utilized with the greatest incremental value for power generation.

The process of sequencing heat sources can leverage considerable value from marginal geothermal resources, geographically broadening where the Earth Battery energy systems can be implemented. The Earth Battery system 10 and the following new embodiments of the Earth Battery can be configured to include the use of emerging $CO_2$ power-system technology to (1) improve efficiency, (2) reduce water consumption, and (3) add $CO_2$-capture, use, and storage (CCUS) benefits of enhanced oil recovery and $CO_2$ sequestration. The Earth Battery system 10 and the following new embodiments thereof can be operated as a self-contained, zero-carbon energy system without importing NG and $CO_2$ over long pipelines to reduce GHG leakage risk.

Figure 7:
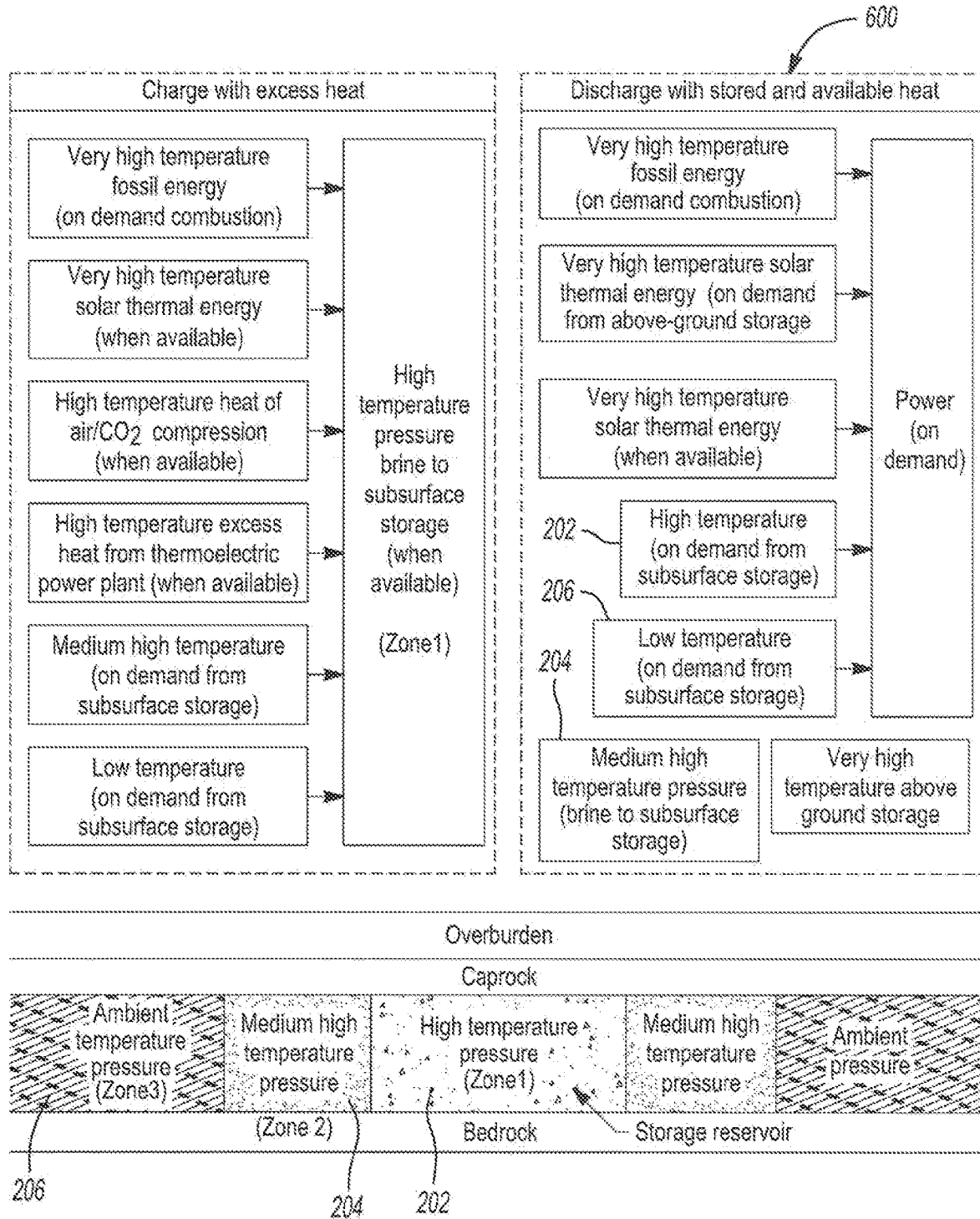
FIG. 7 is a high level block diagram showing another system in accordance with the present disclosure for storing excess energy as thermal energy in a plurality of distinct storage zones within a geologic region, and moving brine within the storage zones as needed to balance the quantities of different temperature stored brine.

Three-Zone, Heated Brine, Thermal Energy Storage with Sequencing of Heat Sources Referring to FIG. 7, a high level new thermal energy storage (TES) system called the Thermal Earth Battery system 600 is shown which converts hot brine to power with even greater efficiently, and with even less pressure oscillations, by using a plurality of distinct brine-temperature zones within a permeable reservoir formation. The system 600 is shown in one specific implementation as system 700 in FIG. 8. In the examples shown in FIGS. 7 and 8, the distinct brine-temperature zones are generally formed as distinct, concentric zones, preferably within a horizontally common permeable geologic region, which is overlain by an impermeable geologic region (also called the caprock as shown in FIG. 7), although some of the third zone (Zone 3) need not be within that horizontally common permeable geologic region. A key function for Zone 3 is to provide enough warm brine for the first and second zones (Zones 1 and 2) to function efficiently. To assure an adequate supply of warm brine, the systems 600 and 700 may also import supplemental brine from one or more separate sources (SBS 340 in FIG. 8), which can comprise a separate geologic formation or brine reservoir, including man-made structures. In this example, the Thermal Earth Battery system 600, and the specific Thermal Earth Battery system 700 implementation shown in FIG. 8, make use of three distinct concentric brine-temperature zones, as shown in both of FIGS. 7 and 8: (1) an inner Zone 1 (region 202) of hot, high-pressure brine having a temperature within a first temperature range; (2) an intermediate Zone 2 (region 204) of medium-hot, medium-high-pressure brine having a temperature within a second temperature range less than the first temperature range; and (3) an outer Zone 3 (region 206) of warm, ambient brine having a third temperature within a third temperature range less than the second temperature range. Furthermore, it will be appreciated that any reference herein to hot brine comprises high-temperature brine and any reference herein to medium-hot brine comprises medium-high-temperature brine. The first temperature range may typically be within a range of about 240° C.-300° C.; the second temperature range may typically be within about 180° C.-220° C., and the third temperature range may typically be within about 40° C.-200° C., although it will be appreciated that these ranges may vary somewhat.

There are several reasons for arranging the three brine-temperature zones in a concentric configuration, with the primary reason being pressure management. To avoid high-temperature brine from flashing to steam, it is necessary for the brine pressure to always exceed the saturation pressure, which, as is well known, increases with brine temperature. In the three brine-temperature-zone configuration the highest brine pressure is needed in the center where brine has the highest temperature. Thus, hot brine in Zone 1 requires a higher pressure than medium-hot brine in Zone 2. Warm ambient brine in Zone 3 does not require very high pressure to prevent that brine from flashing to steam. However, for Zone 2 to have high enough pressure to prevent medium-hot brine from flashing to steam, the pressure within the portion of Zone 3 that is adjacent to Zone 2 needs to be relatively high, compared to ambient pressure conditions. Thus, as described below in greater detail, it is preferred to re-inject cool brine in wells that are in Zone 3, but relatively close to Zone 2, so that enough pressure support is provided to prevent medium-hot and hot brine from flashing to steam in Zones 2 and 1, respectively. For pressurized hot brine to reach the heat exchangers and deliver heat to the power-generation equipment, it is important that pressurized hot brine not flash to steam within the (1) permeable geologic formation, (2) huff/puff wells, and (3) piping through which hot brine flows. Avoiding hot brine from flashing to steam in the huff/puff wells and piping is also needed to limit chemical scale and plugging of the wells and piping, as well as any equipment that may be in contact with the hot brine, such as the heat exchangers. It should also be noted that it is preferred that Zones 1 and 2 lie directly below an impermeable geologic region to contain the pressurized, buoyant medium-hot and hot brine.

The concentric configuration of three brine-temperature-zone zones is also aimed at limiting thermal losses that result from convective mixing of hot brine with ambient-temperature warm brine. Thus, hot brine in Zone 1 mixes with medium hot brine in Zone 2, rather than with warm ambient-temperature brine in Zone 3, while medium-hot brine in Zone 2 mixes with warm brine in Zone 3.

Figure 8:
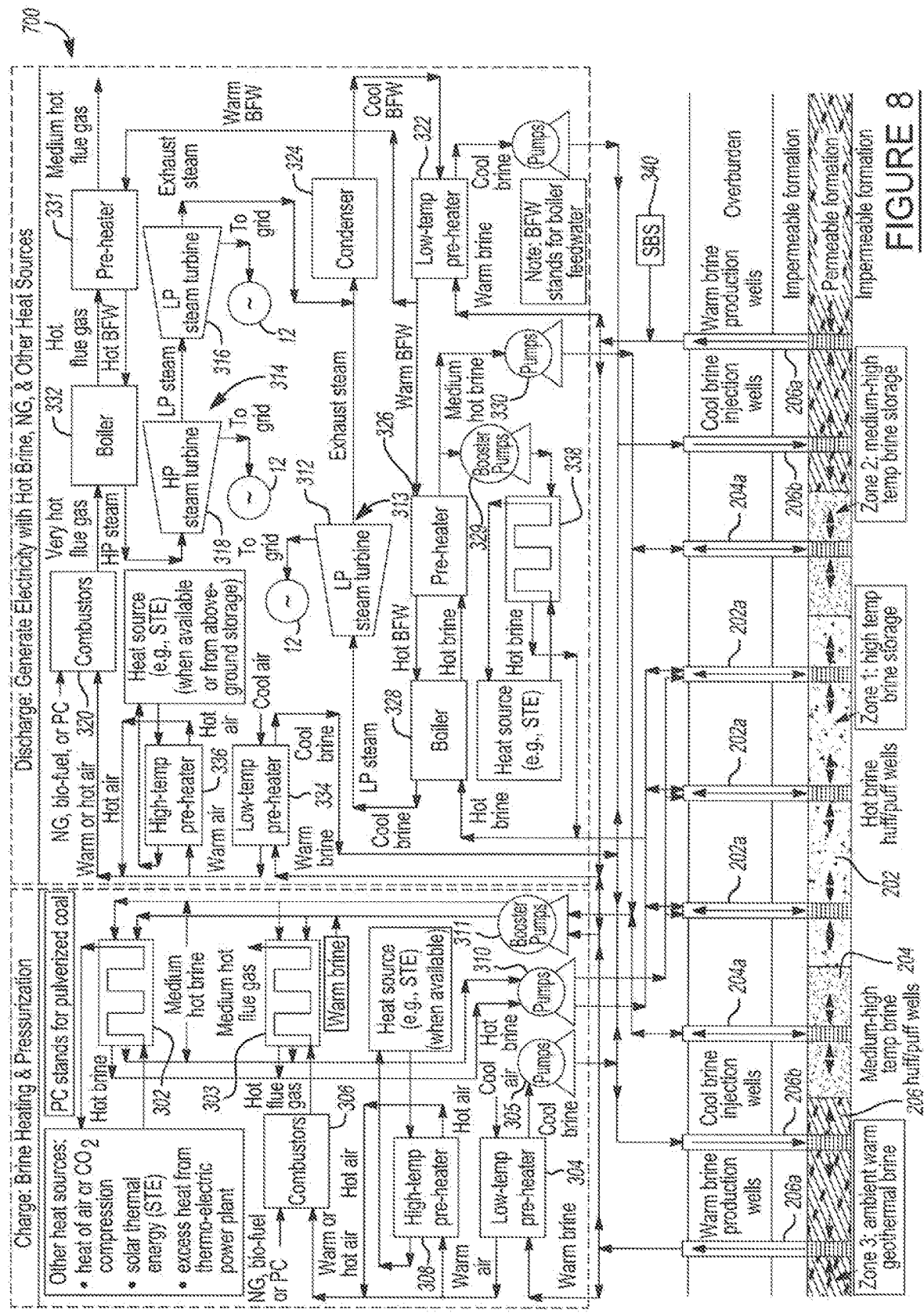
FIG. 8 is a more detailed block diagram of a system similar to that shown in FIG. 7 for storing excess energy in three distinct brine-temperature storage zones within a permeable geologic region.

Before steady-state, cyclical charge/discharge occurs, the systems 600 and 700 are charged by storing heat in two pre-steady-state charging stages (Stages 1a and 1b). The multiple stages in the Thermal Earth Battery systems 600 and 700, shown in FIGS. 7 and 8, are described below in greater detail.

Pre-Steady-State Stage 1a Charging

It should be noted that pre-steady Stages 1a and 1b are one-time processes, which are required prior to conducting the steady-state charge/discharge stages, which are conducted in a cyclical manner, as discussed below. Warm ambient geothermal brine is supplied from at least one of produced brine from Zone 3 (region 206 in FIGS. 7 and 8), via one or more production wells 206a, and imported brine, via one or more separate brine sources (SBS) 340, pressurized to medium-high pressure brine via one or more booster pumps 311 (FIG. 8), heated to medium-hot brine (e.g., 200° C.) using one or more heat exchangers 302,303, possibly pressurized further via one or more pumps 310, and injected using one or more huff/puff wells 202a into the center of Zone 1 (region 202). The heat exchangers 302,303 (FIG. 8) may use one or more heat sources such as combustion of FE, and/or STE, and/or excess heat from thermo-electric power plants. Also, during charging, warm ambient brine may be produced from Zone 3 (region 206), via one or more production wells 206a, and fed into one or more low-temperature pre-heaters 304 (called Low-temp pre-heaters in FIG. 8) to pre-heat cool air to warm air, which may be used as inlet combustion air in one or more FE combustors 306 (FIG. 8). The one or more low-temperature pre-heaters 304 also generate cool brine that may be pumped via one or more pumps 305 into one or more cool brine injection wells 206b to be injected back into Zone 3 (region 206). The one or more cool brine injection wells 206b provide pressure support for Zones 1 and 2 (regions 202 and 204). It is preferred that one or more cool brine injection wells 206b be located close enough to Zone 2 to provide the pressure support needed to prevent hot and medium-hot brine from flashing to steam in Zones 1 and 2.

Collectively, the one or more FE combustors 306 may use one or more FE sources, such as pulverized coal (PC), bio-fuel, or NG. If STE is available either directly or indirectly from either shallow below-ground or above-ground storage, it may be fed into one or more high-temperature pre-heaters 308 (called High-temp pre-heater in FIG. 8) to heat warm air to hot air, which may be used as inlet combustion air in one or more FE combustors 306. Hot flue gas leaving the one or more FE combustors 306 may be fed into one or more heat exchangers 303 to heat warm ambient brine produced from Zone 3 (region 206), via one or more production wells 206a, and/or brine imported from one or more separate brine sources 340, to either medium-hot brine or hot brine, which is injected via one or more pumps 310 into the center of Zone 1 (region 202), via one or more huff/puff wells 202a. Medium hot flue gas leaving one or more heat exchangers 303 may enter a $CO_2$-capture operation (not expressly shown) that generates $CO_2$-free flue gas and nearly pure $CO_2$, which may be compressed for storage or export.

Pre-Steady-State Stage 1b Charging

Stage 1a described above is repeated with the change that during Stage 1b, warm geothermal brine is produced from Zone 3 (region 206) using one or more production wells 206a, pressurized to high-pressure brine via one or more booster pumps 311 (FIG. 8), heated to hot brine (e.g., 250° C.) using one or more heat exchangers 302,303, possibly pressurized further via one or more pumps 310, and re-injected into the center of Zone 1 (region 202) using one or more huff/puff wells 202a. The heat exchangers 302,303 may use a combination of heat sources, as in Stage 1a. Also, during charging, warm ambient brine may be produced from one or more production wells 206a of Zone 3 (region 206) and fed into one or more low-temperature pre-heaters 304 to pre-heat cool air to warm air, which may be used as inlet combustion air in the one or more FE combustors 306. Collectively, the FE combustors 306 may use one or more FE sources, such as PC, bio-fuel, or NG. If STE is available either directly or indirectly from either shallow below-ground or above-ground storage, it may be fed into one or more high-temperature pre-heaters 308 to heat warm air to hot air, which may be used as inlet combustion air in one or more FE combustors 306. Hot flue gas leaving one or more FE combustors 306 may be fed into one or more heat exchangers 303 to heat warm ambient brine produced from Zone 3 (region 206), via one or more production wells 206a, and/or warm brine imported from one or more separate brine sources 340, to hot brine, which is pressurized via one or more pumps 310 and injected into the center region of Zone 1 (region 202), via one or more huff/puff wells 202a. Because high-pressure, hot brine is injected into the center of Zone 1, it displaces the medium-high-pressure, medium-hot brine radially outward, so that medium-high-pressure, medium-hot brine flows into Zone 2 (region 204), with Zone 1 then being fully occupied with high-pressure, hot brine (FIG. 8). After Zones 1 and 2 are charged with enough quantities of hot and medium-hot brine, respectively, the subsurface Thermal Earth Battery systems 600 and 700 are ready for steady-state charge/discharge operations.

Steady-State Stage 2 Charging

Medium-high-pressure, medium-hot brine is produced from the huff/puff wells 204a of Zone 2 (region 204), pressurized to high-pressure brine via one or more booster pumps 311 (FIG. 8), heated to high-pressure hot brine (e.g., 250° C.), using one or more heat exchangers 302,303 and a combination of heat sources, as in Stages 1a and 1b, possibly sent through one or more pumps 310, where it is further pressurized and re-injected back into the center of Zone 1 (region 202), via one or more huff/puff wells 202a. Also, during charging, warm ambient brine may be produced from Zone 3 (region 206) via one or more production wells 206a and fed into one or more low-temperature pre-heaters 304 to pre-heat cool air to warm air, which may be used as inlet combustion air in one or more FE combustors 306. Collectively, the FE combustors 306 may use one or more FE sources, such as PC, bio-fuel, or NG. When STE is available either directly or indirectly from shallow below-ground or above-ground storage, it may be fed into one or more high-temperature pre-heaters 308 to heat warm air to hot air, which may be used as inlet combustion air in one or more FE combustors 306. Hot flue gas leaving the FE combustors 306 may be fed into one or more heat exchangers 303 to heat medium-hot brine produced from Zone 2 (region 204), via one or more huff/puff wells 204a, to hot brine, which, if necessary, is further pressurized via one or more pumps 310 before being injected into the center of Zone 1 (region 202), via one or more huff/puff wells 202a.

Steady-State Stage 3 Discharging

The discharge process may involve two parallel power-generating systems. The first power system is a low-pressure (LP) steam-turbine system 313 (FIG. 8), which is primarily heated with hot brine produced from Zone 1 (region 202). It may also be heated with STE, either directly when STE is available or indirectly with STE taken from shallow below-ground or above-ground storage. The second power system is a multi-stage, steam-turbine system 314, with at least LP steam turbines 316 and high-pressure (HP) steam turbines 318, and optionally medium-pressure (MP) turbines (not expressly shown). If one or more medium-pressure turbines are used, it/they may be placed in series between turbines 316 and 318.

The multi-stage LP-/HP-turbine power system 314 may be heated primarily by FE combustion. It may also be heated primarily by STE, either directly when STE is available or indirectly with STE taken from shallow below-ground or above-ground storage. It may also be heated by STE, either directly when STE is available or indirectly with STE taken from shallow below-ground or above-ground storage, before it is heated by FE combustion. Collectively, the FE combustors 320 may use one or more FE sources, such as PC, bio-fuel, or NG. Both the LP-turbine power system 313 and multi-stage LP-/HP-turbine power system 314 may utilize warm ambient brine produced from Zone 3 (region 206) for pre-heating purposes. Warm ambient brine produced from Zone 3 may be fed into one or more low-temperature pre-heaters 322 to heat initially cool boiler feed water (BFW) that has exited condensers 324 to warm BFW. Warm BFW is fed to at least one of pre-heaters 326,331 where it is heated to hot BFW, using at least one of hot brine produced from Zone 1 (region 202), via one or more huff/puff wells 202a, and very hot flue gas from one or more FE combustors 320. Hot BFW is fed to at least one of boilers 328,332 and heated by at least one of hot brine produced by Zone 1, via one or more huff/puff wells 202a, and very hot flue gas from one or more FE combustors 320. For the LP-turbine power system 313, hot brine produced from Zone 1 (region 202) is used to heat hot BFW so that it becomes LP steam, which is fed to the LP steam turbine 312 where it is used to generate electricity, which is then sent to the grid 12. LP steam leaves the LP steam turbine 312 as an exhaust steam, which is sent to one or more condensers 324. At the condensers 324, it is cooled to become cool BFW. After hot brine leaves one or more pre-heaters 326, it has become medium-hot brine, which is pressurized via one or more pumps 330 to become medium-high-pressure, medium-hot brine and injected into Zone 2, using one or more huff/puff wells 204a. For the LP-/HP-turbine power system, hot BFW is created using one or more preheaters 331 which heats warm BFW received from one or more low-temperature pre-heaters 322 to become hot BFW. It is also possible to send the warm BFW leaving one or more low-temperature pre-heaters 322 through one or more high-temperature pre-heaters (not expressly shown), which is heated using a heat source such as STE, either directly when that heat is available or indirectly with that heat is taken from shallow below-ground or above-ground storage, to create hot BFW, which is then sent to one or more pre-heaters 331. Medium hot flue gas leaving pre-heater 331 may enter a $CO_2$-capture operation (not expressly shown) that generates $CO_2$-free flue gas and nearly pure $CO_2$, which may be compressed for storage or export. The hot BFW enters one or more boilers 332 where it is turned into high pressure (HP) steam, which is fed to one or more HP steam turbines 318. The HP steam turbine 318 uses the HP steam to generate electricity, which is then sent to the grid 12. HP steam exits the HP steam turbine 318 as LP steam, which is fed to one or more LP steam turbines 316 where it also generates electricity, which is then sent to the grid 12. Exhaust steam leaving one or more LP steam turbines 316 is sent to one or more condensers 324 where it cools and becomes cool BFW. The multi-stage LP-/HP-turbine power system 314 may use warm ambient brine to pre-heat inlet combustion air for one or more FE combustors 320. Warm ambient brine is produced using one or more production wells 206a from Zone 3 (region 206) and sent to one or more low-temperature pre-heaters 334 to heat cool air to warm air, which may be sent to one or more FE combustors 320. When STE is directly available, or when STE is taken from shallow below-ground or above-ground storage, it may be sent to one or more high-temperature pre-heaters 336 where it is used to heat warm air to hot air, which may be fed to one or more FE combustors 320. The LP-turbine power system 313 may also use STE. When STE is directly available or when STE is taken from shallow below-ground or above-ground storage, it may be sent to one or more heat exchangers 338 to heat medium-hot brine, which has exited one or more pre-heaters 326. This results in the medium-hot brine becoming hot brine, which is sent to one or more boilers 328 to heat hot BFW to LP steam, which is then sent to one or more LP steam turbines 312 to generate electricity which may be sent to the grid 12. Note that this may require one or more booster pumps 329 to pressurize the medium-hot brine prior to entering the one or more heat exchangers 338.

The new Thermal Earth Battery systems 600 and 700 with three brine-temperature storage zones can be operated as a zero-net-injection, closed-loop process with Zones 1 (region 202) and 2 (region 204) interacting like a piston. Because during steady-state Stage 2 charging, the rate at which high-pressure, hot brine enters Zone 1 can be specified to be the same as the rate at which medium-high-pressure, medium-hot brine leaves Zone 2, the systems 600 and 700 can be operated with no net change in the quantity of stored brine contained within Zones 1 and 2 at any time during the steady-state Stage 2 charging period. Furthermore, because during steady-state Stage 3 discharging, the rate at which high-pressure, hot brine leaves Zone 1 can be specified to be the same as the rate at which medium-high-pressure, medium-hot brine enters Zone 2, the systems 600 and 700 can be operated with no net change in the quantity of stored brine contained within Zones 1 and 2 at any time during the steady-state Stage 3 discharging period. Keeping a constant quantity of stored brine contained within Zones 1 and 2 limits the magnitude of pressure oscillations within these two storage zones during the cyclical charge/discharge process. An important outcome of this approach is that by limiting pressure oscillations, the risk of induced seismicity can be significantly reduced.

The various embodiments described herein all enable a plurality of different, possibly separated, possibly at different elevations, storage zones within the Earth be used to temporarily store heated and/or cooled brine and/or compressed air, $N_2$, $CO_2$, or mixtures of $N_2$ and $CO_2$. Another significant advantage is the system 10 makes highly efficient use of the wells by implementing most of the wells as huff/puff wells, which are used both for fluid injection and for fluid production. The heat of air, $N_2$, and $CO_2$ compression can be used to heat brine, which can also be pressurized using excess electricity, and then stored in a reservoir within the Earth. When energy is needed, either air, $N_2$, $CO_2$, or mixtures of $N_2$ and $CO_2$, plus hot brine, may be produced, with any of these being pre-heated with hot brine before entering an expander, a NG turbine or a PC-, bio-fuel-, or NG-fired $N_2/CO_2$ Brayton cycle turbine, or any other power generating implement. For the Thermal Earth Battery systems 600 and 700, a significant advantage is that it only requires the storage of pressurized, hot brine or hot water for storing energy and dispatching it as electricity when it is demanded by an electric power grid. In the Thermal Earth Battery systems 600 and 700, produced hot brine can be used to heat boiler feedwater in a steam-turbine power system or to heat $N_2$ or $CO_2$, or mixtures of $N_2$ and $CO_2$, in an $N_2$- or $CO_2$-turbine power system. The various embodiments of the present disclosure provide the benefit of short-term energy storage via the compressed air energy storage NG-turbine system, along with combinations of short-, medium-, and long-term energy storage via the $N_2/CO_2$ Brayton cycle power system. Optionally, a steam turbine power system can also be used to provide combinations of short-, medium-, and long-term (seasonal) energy storage. Still another advantage of the system 10 is that it enables heat from other sources, such as a baseload thermoelectric power plant or solar thermal energy, to be stored along with heated fluids (e.g., heated brine), which were heated by the heat of air and/or $CO_2$ compression. Still another advantage of the systems 600 and 700 is that it can store the energy contained in excess natural gas in the form of pressurized hot brine, which can be stored along with heat from other sources. The various embodiments of this disclosure therefore can leverage a plurality of different energy sources simultaneously, and in various combinations, to heat a fluid which can be stored in the Earth for either short or long durations, for the purpose of more efficiently producing electrical power on an electric power grid when needed.

Figure 9:
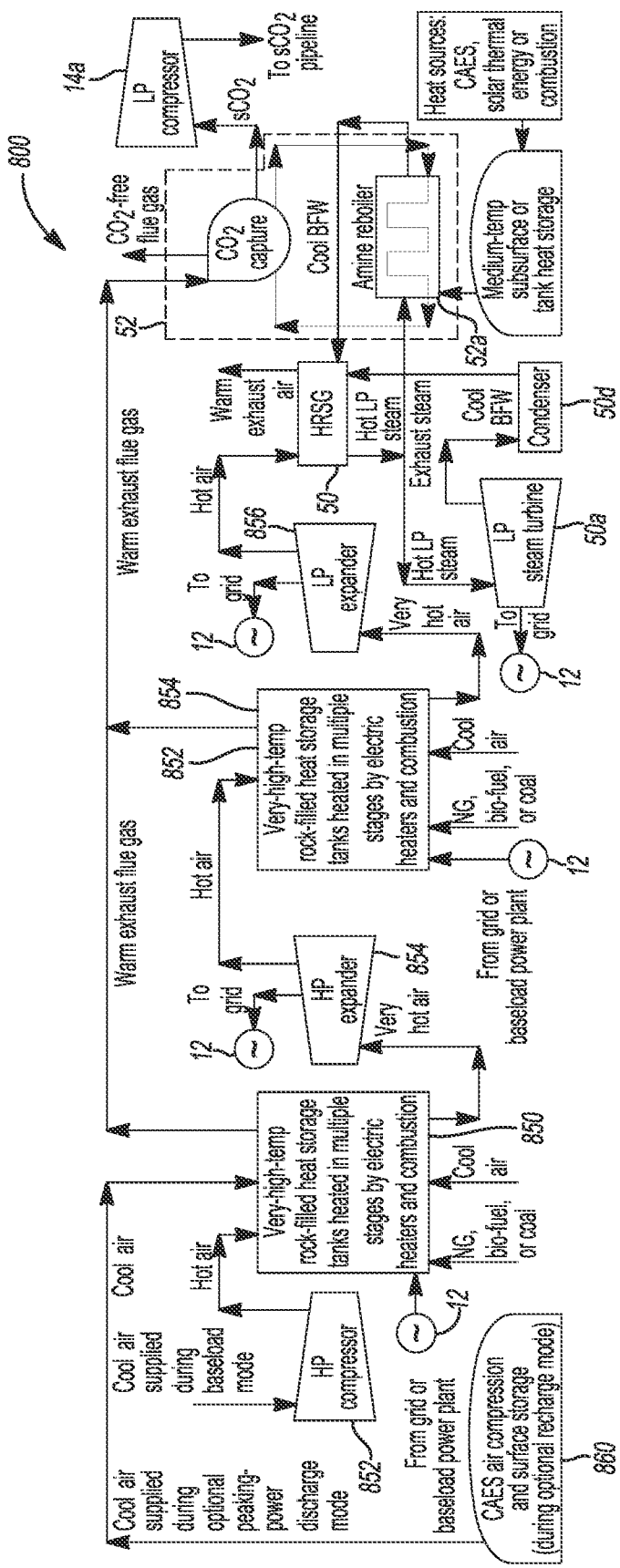
FIG. 9 is a high level block diagram of an embodiment of the compressed air energy storage (CAES) version of the Earth Battery of FIG. 1, which includes the option of operating in "baseload" mode where a high-pressure (HP) compressor is used to supply compressed air, rather than compressed air produced from the CAES subsurface storage reservoir, and which also incorporates the high-/very-high-temperature, thermal energy storage reservoir system to further enhance the overall efficiency of energy production of the CAES version of the system, and further illustrating with coded flow arrows the charge and discharge flows (high and low pressures, respectively) of the flows occurring in the overall system.
Figure 10:
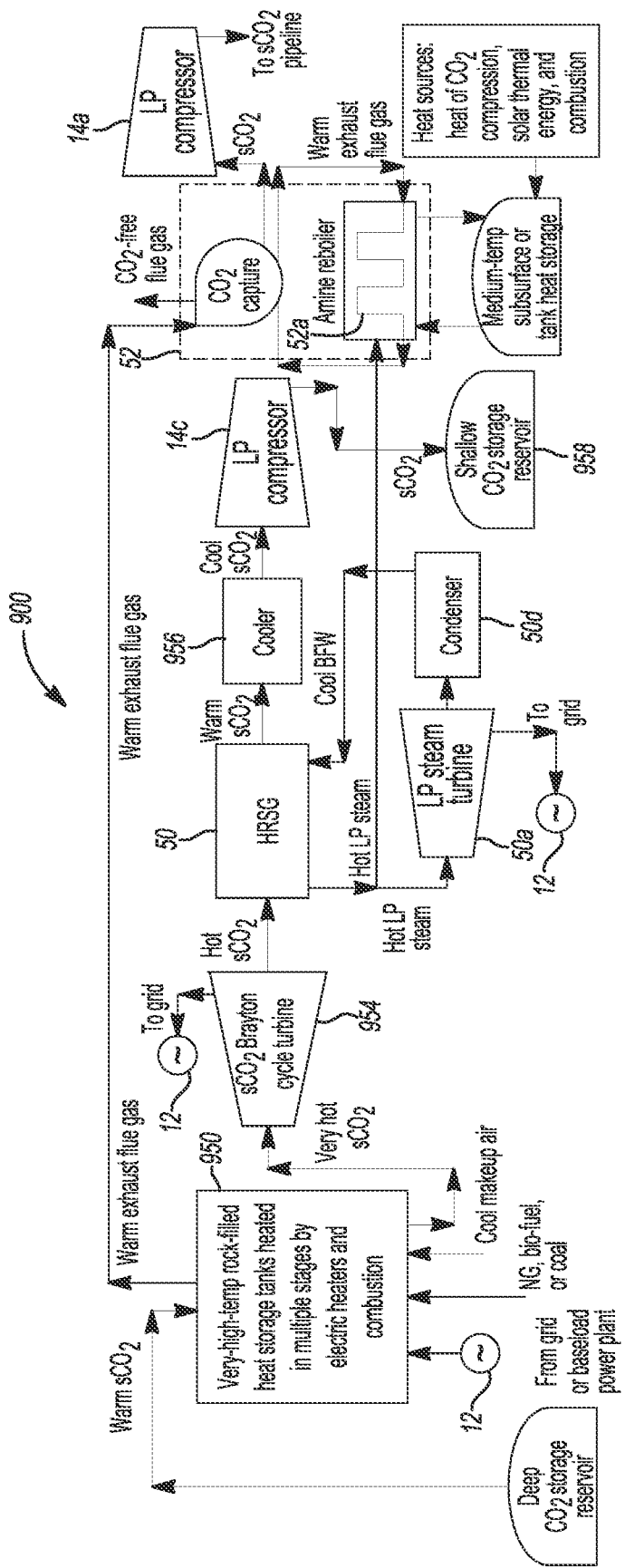
FIG. 10 is a high level block diagram of an embodiment of the $CO_2$ Brayton cycle version of the Earth Battery of FIG. 2 which includes the high-/very-high-temperature, thermal energy storage reservoir system to further enhance the overall efficiency of energy production of the overall system, and further illustrating with coded flow arrows the charge and discharge flows during the charge and discharge modes of operation of the overall system.
Figure 11:
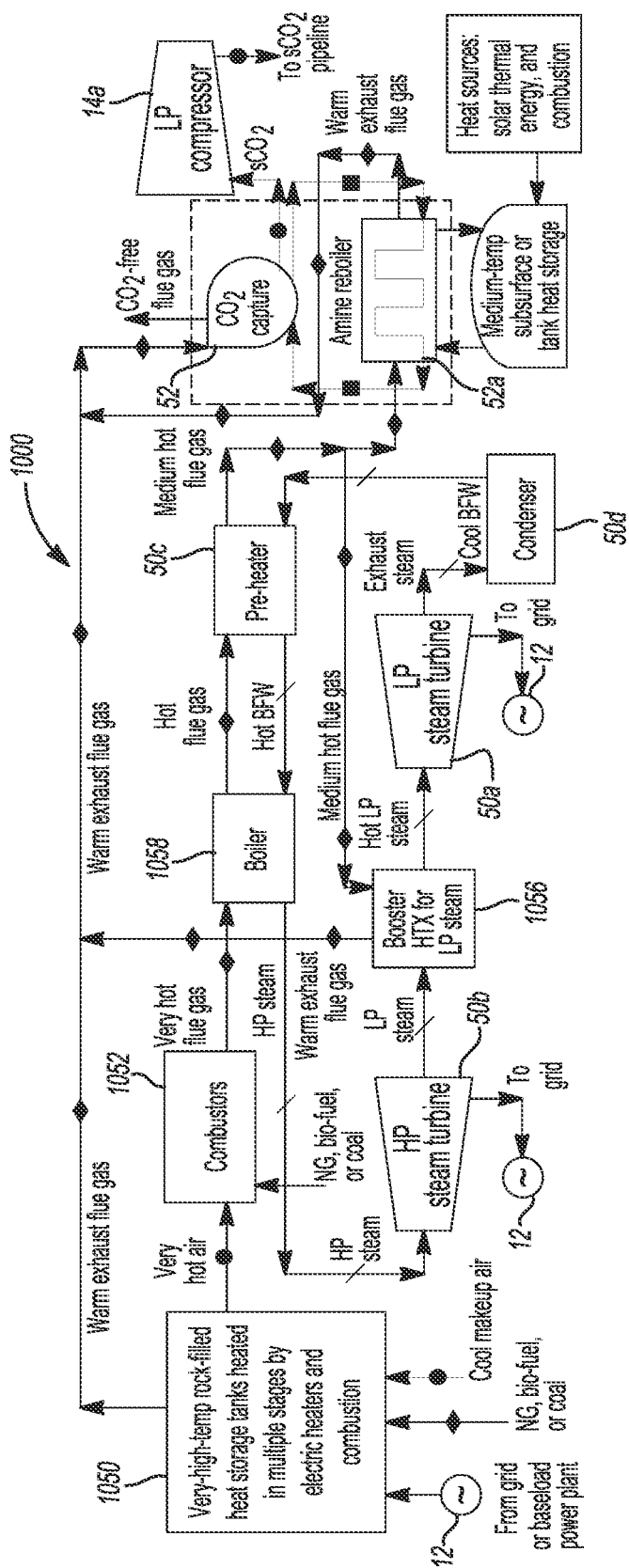
FIG. 11 is a high level process flow block diagram of an embodiment for a steam-turbine version of the Thermal Earth Battery of FIG. 8 which incorporates the high-/very-high-temperature, thermal energy storage reservoir system, and which also illustrates coded flow arrows to show the charge and discharge flows during charge and discharge modes of operation of the overall system.

Earth Battery Augmented with Thermal Energy Storage Granular-Medium-Filled Reservoirs Referring to FIGS. 9-11, further embodiments of a CAES Earth Battery system are shown. The embodiments of FIGS. 9-11 provide systems which meet present day challenges of providing low-cost, high-capacity energy storage by synergistically integrating conventional and renewable-energy resources, allowing each to contribute more efficiently to the grid than if operated independently.

In particular, the Earth Battery systems of FIGS. 9-11 provide large-scale, long-duration energy storage via a combination of bulk-energy-storage (BES) of excess electricity from the grid and power plants and thermal-energy-storage (TES) of various thermal resources, such as geothermal heat, solar thermal energy (STE), heat generated by nuclear energy (NE), the heat of air and $CO_2$ compression, and the heat of fossil energy (FE) combustion. These embodiments take advantage of the Earth's vast storage capacity, insulative properties, and ability to store fluids at high pressure (hundreds of bars) and intermediate temperature (up to ~270° C.), by storing heated pressurized brine in permeable geologic formations, overlain by impermeable caprocks. Such formations are found in hydrocarbon and saline reservoirs across much of the U.S. Above-ground, TES can use various approaches, such as medium-high temperature (up to ~565° C.) heat stored in tanks filled with hot (up to 565° C.) and cold (>260° C.) molten salt. Still another approach for high temperature, or very high temperature, TES is to use granular media, including sand or rocks, or even a mixture of sand and rocks, in reservoir storage devices (e.g., metal storage tanks). Sand and rocks are stable at very high temperature. For example, quartz sand melts to glass at temperature >1700° C. High temperature heat can be generated by electrical resistance heaters, while very high temperature heat can be generated by the heat of FE combustion. Earth-based granular materials offer the advantages of low cost and an abundant and readily available supply. The addition of above ground, high/very-high temperature TES means that the embodiments of the Earth Battery shown in FIGS. 9-11 can be deployed virtually anywhere, even in regions that do not have suitable geology for subsurface TES.

As will be discussed further in connection with the embodiment of FIG. 11, TES/HTX tanks can be used to retrofit a steam-turbine power plant for dispatchable electricity generation, to enable combustion and $CO_2$ generation to occur at a constant or specified rate, and to reduce thermal cycling. These TES/HTX tanks can also be applied to a gas peaker plant or a combined-cycle power plant (FIG. 9) to enable FE combustion to occur at a constant or specified rate, and to reduce thermal cycling. Because FE combustion can occur with minimal excess air, the concentration of $CO_2$ in the flue gas would be greater than in a conventional gas peaker or combined-cycle plant, which would reduce the cost of $CO_2$-capture. Continuous FE combustion at a constant rate allows for continuous $CO_2$ generation at a constant rate. This allows the $CO_2$-capture facility to be sized for the average electricity dispatch rate, rather than the peak dispatch rate, which would maximize the return on capital investment. For a CAES Earth Battery, the heat of air compression can be stored in the form of pressurized hot brine or hot water that may be used to supply the heat required for $CO_2$-capture. Thus, much of the power dispatched from a CAES Earth Battery power plant can be derived from excess electricity, which is used to compress and store air and to generate and store pressurized hot brine or hot water.

TES/HTX tanks can also be used in a $CO_2$ Earth Battery power plant (FIG. 10) for dispatchable electricity generation, to enable combustion and $CO_2$ generation to occur at a constant or specified rate, and to reduce thermal cycling. FE combustion may be implemented by using a conventional furnace that uses combustion air, or it instead may use the pressurized oxy-fuel combustion process that produces a nearly pure stream of $CO_2$ in the flue gas.

Earth Battery technology can be used to upgrade a conventional steam-turbine power plant to become a cost-effective, zero-carbon power system that efficiently incorporates all forms of conventional and renewable energy whenever those sources are available, and allow electricity to be dispatched when it is demanded. Earth Battery technology can also be used to upgrade conventional gas-turbine and combined-cycle plants to become a cost-effective, zero-carbon power system that efficiently incorporates all forms of conventional and renewable energy sources whenever those sources are available, and allow electricity to be dispatched when it is demanded.

CAES Earth Battery with Combined-Cycle Power Generation

Referring now specifically to FIG. 9, a system 800 is shown for forming an Earth Battery which builds on the CAES Earth Battery 10 of FIG. 1 and uses additional resources to generate electricity for the power grid 12 using additional features and methods including high-/very-high-temperature, heat-storage reservoirs. Components shown in FIG. 9 which are common to those discussed in connection with FIG. 1 are designated using the same reference numbers used in discussing system 10 of FIG. 1.

Figure 9A:
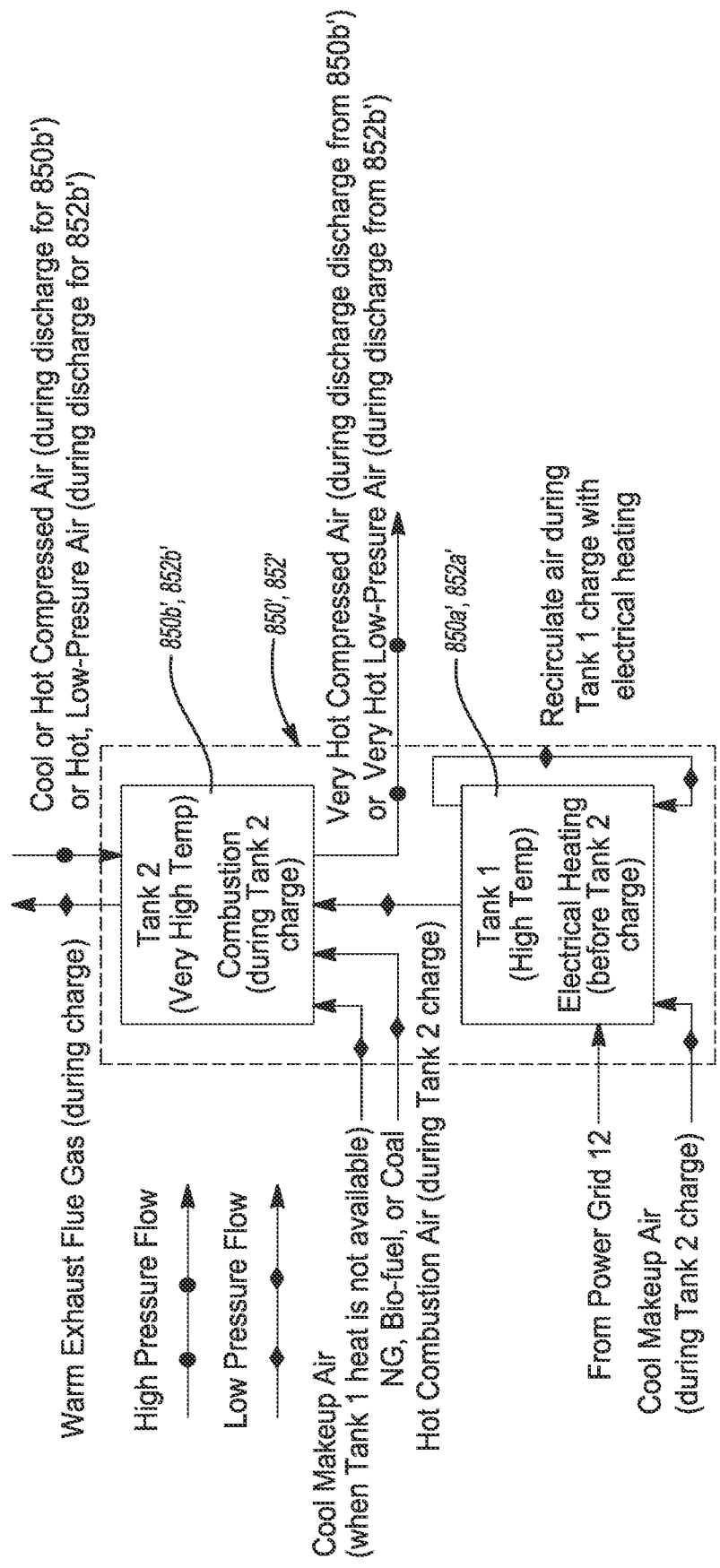
FIG. 9a shows an optional embodiment of the thermal energy storage reservoir system that employs a stack of two serially-connected, sand- and/or rock-filled tanks for the CAES version of the Earth Battery, a first tank operating as a high temperature thermal storage tank and which feeds a second tank operating as a very high temperature thermal storage tank.

The system 800 includes thermal storage reservoir systems 850 and 852, which can be used to further pre-heat the hot compressed air being supplied to a high pressure (HP) expander 854 and a low pressure (LP) expander 856, respectively. Each of the reservoir systems 850 and 852 will contain multiple (two or more) stacks of one, two or more distinct reservoirs that are arranged serially such that an output of one feeds another, and so forth. Multiple stacks of tanks are required because to enable continuous combustion there will always be at least one stack in charge mode until that stack is either partially or fully heated, while other stacks may be in discharge mode until the very-high-temperature heat contained in those stacks has been either partially or fully discharged. FIG. 9a shows such an embodiment of an individual stack of a multi-stack, multi-tank tank reservoir system 850' which incorporates independent, serially-connected first and second metal tanks forming separate reservoirs 850a' and 850b'. If at least two distinct reservoirs are formed by the reservoir system 850, then one (e.g., reservoir 850a') may form a high heat reservoir that outputs heated air to the input of a very high heat reservoir (i.e., reservoir 850b').

Referring to FIG. 9a, during the charge mode, reservoirs 850a' and 850b' may be heated successively in two stages. Optionally, reservoir 850b' may be heated in just one stage. During the first stage, reservoir 850a' may be heated with electrical heaters whenever excess electricity is available from the power grid 12. Air may be recirculated in reservoir 850a' to evenly distribute the heat. The second stage may begin after reservoir 850a' has been either partially or fully heated. During the second stage, cool makeup air is sent through reservoir 850a' to become hot combustion air, which is sent to reservoir 850b' where it is combusted with NG, bio-fuel, or coal to form very-high-temperature flue gas that heats up the granular media in reservoir 850b' before the flue gas leaves reservoir 850b' as warm exhaust flue gas. If reservoir 850b' is heated in one stage, cool makeup air enters reservoir 850b' where it is combusted with NG, bio-fuel, or coal to form very-high-temperature flue gas that heats up the granular media in reservoir 850b' before the flue gas leaves reservoir 850b' as warm exhaust flue gas.

Referring to FIG. 9a, during the discharge mode, cool compressed air from the CAES subsystem 860 or hot compressed air from the high-pressure HP compressor 858 enters reservoir 850b' where it is heated by the very-high-temperature heat stored in the granular media in reservoir 850b'. After it is heated by the granular media, very hot compressed air leaves reservoir 850b' and is sent to the high-pressure HP expander 854 where it is used to generate electricity for the grid 12.

Referring to FIG. 9a, reservoir system 852 may also be formed as a multi-stack, multi-tank reservoir system like that described above for reservoir system 850. The charge mode in reservoir system 852 is the same as that described above for reservoir system 850. The discharge mode in reservoir system 852 is similar to that described above for the reservoir system 850, but with the two following differences. Rather than being supplied by the cool compressed air from the CAES subsystem 860 or by the hot compressed air from the HP compressor 858, reservoir 852b' is supplied by the hot, low-pressure air that leaves the HP expander 854. After the hot, low-pressure air is further heated by the very-high-temperature granular media in reservoir 852b', very hot, low-pressure air leaves reservoir 852b' and is sent to the low-pressure LP expander 856 where it is used to generate electricity for the grid 12.

Each of the reservoir systems 850 and 852 (or reservoir tanks 850a' and 850b') may contain a thermal energy storage ("TES") medium that is able to store a large quantity of heat. For example, sand or rock may form the thermal storage medium, or even a combination of sand and rock may be used. Relatively small grain size is preferred for rapid thermal equilibration with the air or $sCO_2$ that is passing through. However, if the grain size is too small it will cause too much flow resistance, with the pressure loss decreasing system efficiency. The reservoir systems 850 and 852 may each be formed by one or more individual metal tanks, as noted above, which are filled with the selected thermal storage medium. For convenience, the following discussion of the operation of the system 800 will be made with reference to use of the reservoir systems 850 and 852.

The system 800 may operate in two distinct modes: a charge mode and a discharge mode. The system 800 shows flow arrows to help explain the flows for both the charge mode and the discharge mode. It will also be appreciated that the system 800 is for a compressed air energy storage (CAES) version of the Earth Battery system 10 of FIG. 1, which includes combined cycle power generation.

For the charge mode, air and flue gas flow under low pressure. For the discharge mode, compressed air flows under high pressure (e.g., typically, 100 bar or greater). Where local geologic conditions do not allow for a CAES subsystem 860, or when it is decided to operate the system in baseload mode (i.e., without the CAES subsystem 860), a high-pressure (HP) compressor 858 is used to supply compressed air in real time in place of the CAES subsystem 860. Some of the heat from the heat recovery steam generator (HRSG) 50 may be sent to amine reboilers 52a, which support the $CO_2$-capture system 52. Other medium-temperature heat sources for the $CO_2$-capture system 52 may include (1) heat of air compression from CAES, (2) solar thermal energy, and (3) fossil fuel combustion. The CAES subsystem 860 allows peaking power-discharge mode, which can discharge electricity at a higher rate than during the baseload mode, which uses compressed air supplied by the HP compressor 858, rather than compressed air supplied by the CAES subsystem 860. By "baseload" mode it is meant that the system is operating as a standard baseload power plant would, with no assistance from compressed air supplied from a CAES system, such as from the CAES subsystem 860 shown in FIG. 9.

The system of FIG. 9 also discloses that the HRSG 50 may incorporate a steam turbine system 50a turbine and condenser 50b. The $CO_2$-capture system 52 may incorporate the $CO_2$-capture operation 52 and amine reboilers 52b. Furthermore, the option exists for using some or all steam from the HRSG 50 to supply heat to the amine reboilers 52a used in the $CO_2$-capture process.

Cool air may enter the reservoir systems 850 and 852. Optionally, the reservoir system 850 may even be heated by electrical heaters powered by excess electricity from the grid 12 (as noted in FIG. 9a) or from a baseload power plant, which creates high temperatures in the sand and/or rock contained in the reservoir system 850.

Referring to FIGS. 1 and 9, very hot compressed air that leaves the reservoir system 850 may be used as combustion air for combustion in the NG-fired HP turbine 44 and the NG-fired LP turbine 42, respectively. The fossil fuel used to help heat the thermal storage medium in the reservoir system 850 may be bio-fuel, NG, coal or virtually any other available fossil energy source. The sand, rock and/or sand/rock mixture in the reservoir system 850 serves as the TES storage medium.

Cool, makeup air may be sent to the reservoir systems 850 and 854 for combustion, which heats up the sand and/or rock in the reservoir system. Warm exhaust flue gas that leaves the reservoir systems 850 and 852 may be sent to the $CO_2$-capture system 52. The amine reboilers 52a, which supports the $CO_2$-capture system 52, may be heated by medium-temperature TES from either hot brine produced from a hot-brine storage reservoir or by hot brine or water from a hot brine/water two-tank system.

When hot brine from the subsurface hot-brine storage reservoir is used, it is possible to use seasonally-stored, medium-temperature heat to supply the heat needed by the amine reboilers 52a throughout the year. This is particularly attractive for the case where solar thermal energy (STE) is the source of stored medium-temperature heat. The ability of the Earth Battery to store medium-temperature heat seasonally makes it possible for STE collected throughout the year to be available to supply the heat needed by the amine reboilers 52a on a daily and hourly basis, regardless of whether the sun is shining. Thus, our technology enables STE, which is a VRE, to be utilized as a reliable energy source throughout the year, regardless of when it was collected and stored. Utilizing STE for the purpose of capturing $CO_2$ is very attractive, because it allows increased penetration of VRE without the typical burden that VRE imposes on electric grids.

The amine reboilers 52a used in the $CO_2$-capture process, may also be pre-heated with warm geothermal brine prior to being heated by the hot brine and/or water. Nearly $CO_2$-free exhaust leaves the $CO_2$-capture system 52 and nearly-pure, cool $sCO_2$ is sent to the low-pressure (LP) compressor 14a where it is compressed. Compressed $sCO_2$ leaving the LP compressor 14a may be sent to a $sCO_2$ pipeline and/or a $sCO_2$ storage reservoir.

Cold, compressed air is produced from the CAES reservoir 860 and enters the reservoir system 850 where it becomes very hot compressed air by the time it is discharged. The very hot air leaves the reservoir system 850 and enters the HP expander 854, which is a fossil-fuel-free turbine, to generate electricity for the grid 12. The air leaves the HP expander 854 at reduced pressure and reduced temperature to form low-pressure (LP) hot air. The LP hot air enters the reservoir system 852 where it becomes very hot air. The very hot air enters the LP expander 856, which is a fossil-fuel-free turbine, to generate electricity for the grid 12. The air leaves the LP expander 856 at nearly atmospheric pressure and reduced temperature to form hot air. The hot air may enter the heat recovery steam generator (HRSG) 50, which is used to generate hot LP steam which is fed into the LP steam turbine 50a to generate electricity for the grid 12. The air discharged from the HRSG 50 is cooled to warm exhaust air.

$CO_2$ Earth Battery

Referring now to FIG. 10, a system 900 is shown which augments the capabilities of the $CO_2$ Earth Battery system 100 of FIG. 2. Again, components in the system 900 in common with those of the system 100 will be denoted with the same reference numbers used to describe the system 100, and components in common with the system 800 will be denoted with the same reference number used to describe the system 800. The $CO_2$ Earth Battery system 100 (FIG. 2) combines energy resources to generate electricity for the grid 12, and further is adapted to use the additional features and methods described below to form the new system 900 of FIG. 10.

Figure 10A:
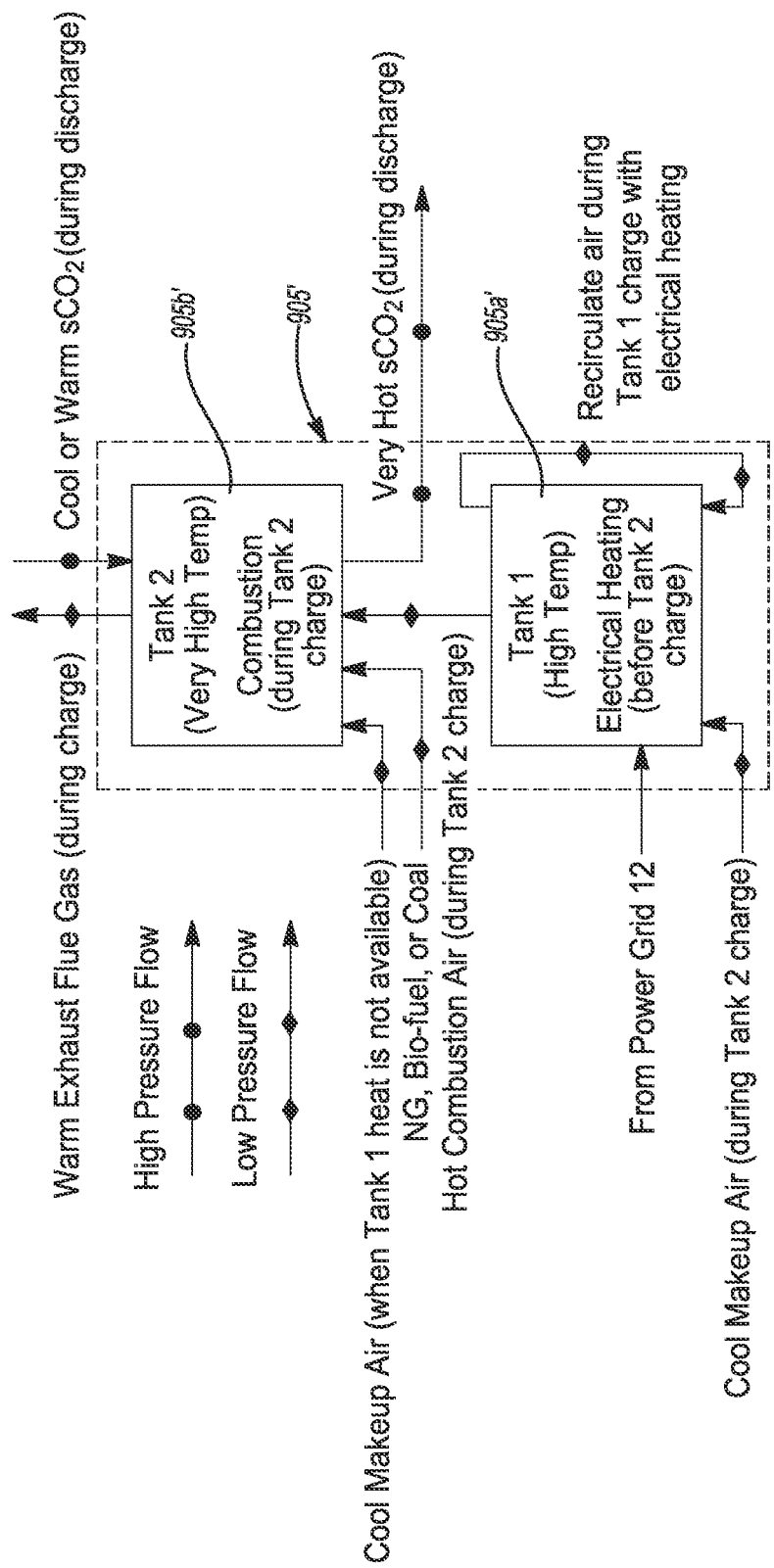
FIG. 10a shows an optional embodiment of the thermal energy storage reservoir system that employs a stack of two serially-connected, sand- and/or rock-filled tanks for the $CO_2$ Brayton cycle version of the Earth Battery, a first tank operating as a high temperature thermal storage tank and which feeds a second tank operating as a very high temperature thermal storage tank.

With reference to FIGS. 10 and 10a, as in the CAES Earth Battery system with combined-cycle power generation 800, a reservoir system 950, which may be the same in its construction, thermal storage medium, and operation as the reservoir system 850, is incorporated and operates in both of the above-described charge and discharge modes of operation. As is the case for the CAES Earth Battery, multiple (two or more) stacks of tanks are required because to enable continuous combustion there will always be at least one stack in charge mode until that stack is either partially or fully heated, while other stacks may be in discharge mode until the very-high-temperature heat contained in one or more of those stacks has been either partially or fully discharged. FIG. 10a shows the two-stage heating process in an individual stack of serially-connected tanks for the $CO_2$ Earth Battery system.

Referring to FIG. 10a, during the charge mode, reservoirs 950a' and 950b' may be heated successively in two stages. Optionally, reservoir 950b' may be heated in just one stage. During the first stage, reservoir 950a' may be heated with electrical heaters whenever excess electricity is available from the power grid 12. Air may be recirculated in reservoir 950a' to evenly distribute the heat. The second stage may begin after reservoir 950a' has been either partially or fully heated. During the second stage, cool makeup air is sent through reservoir 950a' to become hot combustion air, which is sent to reservoir 950b' where it is combusted with NG, bio-fuel, or coal to form very-high-temperature flue gas that heats up the granular media in reservoir 950b' to very high temperature before the flue gas leaves reservoir 950b' as warm exhaust flue gas. If reservoir 950b' is heated in one stage, cool makeup air enters reservoir 950b' where it is combusted with NG, bio-fuel, or coal to form very-high-temperature flue gas that heats up the granular media in reservoir 950b' before the flue gas leaves reservoir 950b' as warm exhaust flue gas.

Referring to FIG. 10a, during the discharge mode, $sCO_2$ enters reservoir 950b' where it is heated by the very-high-temperature heat stored in the granular media in reservoir 950b'. After it is heated by the granular media, very hot $sCO_2$ leaves reservoir 950b' and is sent the $sCO_2$ Brayton cycle turbine 954 where it is used to generate power for the grid 12.

FIGS. 10 and 10a show the process flow for both the charge and discharge mode with the $CO_2$ Brayton cycle version of the Earth Battery (i.e., the underlying system 100 of FIG. 2). For the charge mode, air and flue gas flow under low pressure. For the discharge mode, $sCO_2$ flows under high pressure. Some of the heat from the HRSG 50 may be sent to the amine reboilers 52a used in the $CO_2$-capture process. Other medium-temperature heat sources for $CO_2$- capture may include solar thermal energy, heat of $CO_2$ compression, and fossil fuel combustion.

For the charge mode, FE combustion occurs in the tank of the reservoir system 950, with very hot flue gas flowing through the reservoir system from bottom to top under low pressure as shown in the drawings of FIG. 10 and FIG. 10a. For the discharge mode, the tank of the reservoir system 950 may be filled with $sCO_2$, which flows from top to bottom under very high pressure (e.g., typically, 100 bar or more).

The flue gas loop for the charge mode is also indicated in FIGS. 10 and 10a. Cool air may enter the reservoir system 950 and may be optionally heated in multiple stages using electrical heaters powered by excess electricity from the grid 12 or from a baseload power plant, followed by combustion heating using NG, bio-fuel, or coal as shown in FIG. 10a. Or, optionally, it may be heated in one stage by combustion using NG, bio-fuel, or coal. The heating creates very high temperatures in the sand and/or rock contained in the reservoir system 950.

Warm exhaust flue gas that leaves the reservoir 950 may be sent to the $CO_2$-capture system 52. Optionally, the amine reboilers 52a used in the $CO_2$-capture process, may be heated by medium-temperature TES from either hot brine produced from a subsurface, hot-brine, storage reservoir or by hot brine or water from a hot brine/water two-tank system. The heat contained in the hot brine or hot water may also be used directly in the amine reboilers 52a used in the $CO_2$-capture process. Optionally, the amine reboilers 52a used in the $CO_2$-capture process may also be pre-heated with warm geothermal brine prior to being heated by the hot brine and/or water. Nearly $CO_2$-free exhaust leaves the $CO_2$-capture system 52 and cool, nearly-pure $sCO_2$ is sent to the LP compressor 14a where it is compressed. Compressed $sCO_2$ leaving the LP compressor 14a may be sent to a pipeline and/or a $CO_2$ storage reservoir.

The $sCO_2$ power cycle for the discharge mode is also shown in FIG. 10. Warm $sCO_2$ is produced from a deep, relatively-warm, $CO_2$ storage reservoir 952 and enters the reservoir system 950, and then flows through the reservoir system 950 where it becomes very hot $sCO_2$. Very hot $sCO_2$ leaves the reservoir system 950 and enters a $sCO_2$ Brayton-cycle turbine 954, which is a fossil-fuel-free turbine, to generate electricity for the grid 12. The $sCO_2$ leaves the $sCO_2$ turbine 954 at reduced pressure and temperature to form hot $sCO_2$.

The hot $sCO_2$ enters the heat recovery steam generator (HRSG) 50, where the hot $sCO_2$ is cooled to form warm $sCO_2$. Steam from the HRSG 50 is sent to the LP steam turbine 50a to generate electricity for the grid 12. The warm $sCO_2$ that leaves the HRSG 50 is input to a cooler 956, which turns it into cool $sCO_2$. The cool $sCO_2$ leaving the cooler 956 may then be sent to either a pump (not shown) where it is pressurized, or a LP compressor 14c where it is compressed, and sent to a $CO_2$ storage reservoir 958, which can be a shallow or deep reservoir. The purpose of using a shallow reservoir is to minimize the pumping or compression costs needed to store the $sCO_2$.

Thermal Earth Battery

Referring to FIG. 11, an Earth Battery system 1000 is shown which augments the Earth Battery system 700 of FIG. 8 through the use of a thermal energy storage reservoir system 1050. Components in common with the Earth Battery system 700 are shown in FIG. 11 using the same reference numbers, and components in common with those used to describe the system 700 are shown with the same numbers used in FIG. 8.

Figure 11A:
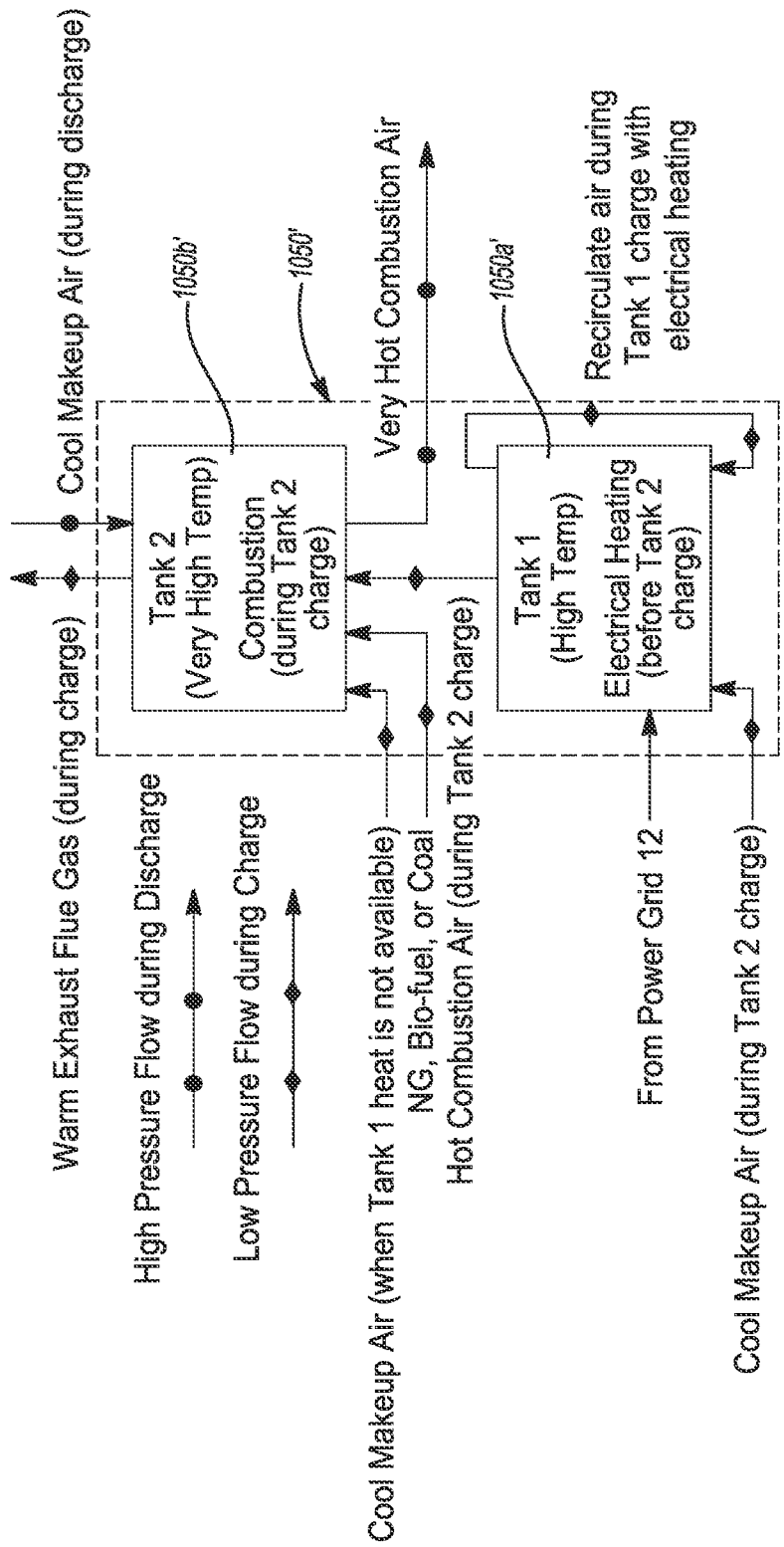
FIG. 11a shows an optional embodiment of the thermal energy storage reservoir system that employs two serially-connected, sand- and/or rock-filled tanks for the steam-turbine version of the Thermal Earth Battery, a first tank operating as a high temperature thermal storage tank and which feeds a second tank operating as a very high temperature thermal storage tank.

The reservoir system 1050, shown in FIG. 11a, may be similar to the reservoir system 850 described hereinbefore, shown in FIG. 9a and the reservoir system 950, shown in FIG. 10a. One noteworthy difference is that during discharge, reservoir system 1050 operates under low-pressure conditions (e.g., <10 bar), rather than under high-pressure conditions (100 bars or greater) for reservoir systems 850 and 950. The Earth Battery system 1000 combines energy resources to generate electricity for the grid using the reservoir system 1050 and may operate in the charge and discharge modes in a similar manner as described herein for the Earth Battery systems 800 and 900.

As described above for the reservoir system 850 and in connection with FIG. 9a, the reservoir system 1050 shown in FIG. 11a may also be formed from two or more stacks of serially-connected metal tanks. FIG. 11a shows one stack of serially-connected tanks for the Thermal Earth Battery. Multiple stacks of tanks are required because to enable continuous combustion there will always be at least one stack in charge mode until that stack is either partially or fully heated, while other stacks may be in discharge mode until the very-high-temperature heat contained in one or more of those stacks has been either partially or fully discharged. Continuous combustion at a constant rate generates a continuous and constant-rate stream of $CO_2$, which enables the full and continuous utilization of the amine reboilers 52a and the $CO_2$-capture system 52.

Referring to FIG. 11a, during the charge mode, reservoirs 1050a' and 1050b' may be heated successively in two stages. Optionally, reservoir 1050b' may be heated in just one stage. During the first stage, reservoir 1050a' may be heated with electrical heaters whenever excess electricity is available from the power grid 12. Air may be recirculated in reservoir 1050a' to evenly distribute the heat. The second stage may begin after reservoir 1050a' has been either partially or fully heated. During the second stage, cool makeup air is sent through reservoir 1050a' to become hot combustion air, which is sent to reservoir 1050b' where it is combusted with NG, bio-fuel, or coal to form very-high-temperature flue gas that heats up the granular media in reservoir 1050b' before the flue gas leaves reservoir 1050b' as warm exhaust flue gas. If reservoir 1050b' is heated in one stage, cool makeup air enters reservoir 1050b' where it is combusted with NG, bio-fuel, or coal to form very-high-temperature flue gas that heats up the granular media in reservoir 1050b' before the flue gas leaves reservoir 1050b' as warm exhaust flue gas.

Referring to FIG. 11, warm exhaust flue gas that leaves the reservoir system 1050 is sent to $CO_2$-capture system 52, which forms cool, nearly-pure $sCO_2$ and nearly $CO_2$-free exhaust that leaves the $CO_2$-capture system 52. Cool $sCO_2$ that leaves the $CO_2$-capture system 52 is sent to the LP compressor 14a. Cool $sCO_2$ that leaves the LP compressor 14a may be sent to a $CO_2$ storage reservoir and/or a $sCO_2$ pipeline.

Referring to FIG. 11a, during the discharge mode, cool makeup air enters reservoir 1050b' where it is heated by the very-high-temperature heat stored in the granular media in reservoir 1050b'. After it is heated by the very hot granular media, very hot air leaves reservoir 1050b' and is sent to the combustors 1052, shown in FIG. 11, where it is used as very-high-temperature combustion air for the combustion of fossil fuel, which can be NG, bio-fuel, or coal. The combustors 1052 generate very high temperature flue gas, which is sent through the very hot flue gas loop, which heats the boiler feedwater (BFW)/steam loop as described below.

The very hot flue gas loop is shown as arrows with diamond-shaped indicators in FIG. 11. The BFW/steam loop is shown as arrows with slanted lines in FIG. 11. Very hot flue gas that leaves the combustors 1052 is sent to the boilers 1058 where it creates high-pressure (HP) steam and forms hot flue gas. The HP steam is sent to HP steam turbines 50b where it generates electricity for the grid 12 and forms low-pressure (LP) steam. Hot flue gas that leaves the boilers 1052 is sent to the pre-heaters 50c where it heats cool BFW to become hot BFW and forms medium hot flue gas. The hot BFW is sent to the boilers 1052 and some or all of the medium hot flue gas is sent to the booster HTX 1056, which may be used to boost the steam temperature between steam-turbine stages, such as between the high-pressure (HP) steam turbine 50b and the low-pressure (LP) steam turbine 50a. Optionally, some or all of the medium hot flue gas that leaves the pre-heater 50c may be sent to supply heat required by the amine reboilers 52a used in the $CO_2$-capture process. Optionally, the amine reboilers 52a that support the $CO_2$-capture system 52 may be heated by medium-temperature TES from either hot brine produced from a subsurface, hot-brine storage reservoir or by hot brine or hot water from a hot brine/water two-tank system. Also, optionally, the amine reboilers 52a used in the $CO_2$-capture process, may be pre-heated with warm geothermal brine prior to being heated by the hot brine and/or hot water.

Referring to FIG. 11, LP steam that leaves the HP turbine 50b may be sent directly to the LP turbine 50a where it is used to generate electricity for the grid 12 and to form exhaust steam that is sent to the condensers 50d where it becomes cool BFW. Optionally, LP steam that leaves the HP turbine 50b may be sent to the booster HTX 1056 where it becomes hot LP steam that is sent to the LP turbine 50a where it is used to generate electricity for the grid 12 and to form exhaust steam that is sent to the condensers 50d where it becomes cool BFW. Cool BFW that leaves the condensers 50d is sent to the pre-heaters where it is heated by hot flue gas to become hot BFW.

While not expressly shown in FIG. 11, when electricity is not being generated, high-temperature or very-high-temperature air may be recirculated between reservoir system 1050 and the combustors to maintain high enough temperatures in the combustors to mitigate thermal cycling. This enables the power system to quickly ramp up to create steam and to generate electricity when it is demanded.

While not expressly shown in FIG. 11, when electricity is not being generated, thermal cycling is mitigated by recirculating medium hot BFW between the medium-temperature subsurface reservoir or two-tank TES system and the pre-heaters and boilers.

In addition to steam turbines, the system 1000 may incorporate the option of using organic Rankine cycle (ORC) turbines and replacing BFW with an organic fluid, such as isopentane, or refrigerants, such as Freon. This option allows the Thermal Earth Battery system 1000 to operate efficiently at lower temperatures, when local conditions may dictate that.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for storing excess energy from at least one energy producing source, as thermal energy, using an existing geologic formation, the method comprising:

using a first storage zone formed in the existing geologic formation for storing high temperature brine having a temperature within a first temperature range; and using a second storage zone formed in the existing geologic formation adjacent the first storage zone for storing medium high temperature brine having a temperature within a second temperature range less than the first temperature range;

when the excess energy is available from the at least one energy producing source, withdrawing a quantity of the medium high temperature brine and heating the withdrawn quantity of medium high temperature brine using the excess energy to produce a first new quantity of high temperature brine; and injecting the first new quantity of high temperature brine into the first storage zone; and using the injection of the first new quantity of high temperature brine to force a quantity of medium high temperature brine present in the first storage zone into the second storage zone, to maintain a desired quantity of high temperature brine in the first storage zone and a desired quantity of medium high temperature brine in the second storage zone.

2. The method of claim 1, further comprising using a third storage zone formed within the geologic formation adjacent the second zone, for storing warm brine having a temperature within a third temperature range less than the second temperature range.

3. The method of claim 2, wherein the warm brine is withdrawn from at least one of the third storage zone, a separate geologic formation, and a separate brine reservoir, and pressurized and heated using the excess energy to a second new quantity of medium high temperature brine, and then injected into the first storage zone.

4. The method of claim 3, wherein heating the warm brine comprises using at least one of a plurality of heaters arranged in series, and wherein the heaters are arranged from a lowest quality heat source to a highest quality heat source.

5. The method of claim 3, further comprising performing the withdrawal and heating of warm brine from at least one of the third storage zone, the separate geologic formation and the separate brine reservoir in first and second distinct stages.

6. The method of claim 3, wherein the withdrawing the warm brine comprises using at least one production well in communication with the third storage zone.

7. The method of claim 2, wherein the third storage zone at least partially circumscribes the second storage zone.

8. The method of 6, wherein the first, second and third storage zones are located at an elevationally common level with one another.

9. The method of claim 2, further comprising:

withdrawing a quantity of the warm brine and feeding the withdrawn quantity of warm brine through a low temperature pre-heater to help in heating an airflow flowing through the low temperature pre-heater, which also causes cooling of the withdrawn quantity of warm brine to produce a quantity of cooled brine, and re-injecting the quantity of cooled brine into the third storage zone; and flowing warm air towards at least one of a fossil energy combustor or a high temperature pre-heater heated with the excess energy to produce a flow of hot air and a second quantity of warm brine and re-injecting the second quantity of warm brine into the third storage zone, and then flowing the hot air towards at least one of a fossil energy combustor or a high temperature pre-heater.

10. The method of claim 9, wherein injecting a quantity of at least one of cooled brine or warm brine comprises using at least one injection well in communication with the third storage zone.

11. The method of claim 2, further comprising:
withdrawing an additional quantity of warm brine from the third storage zone; and
using the withdrawn additional quantity of warm brine to help warm a fluid flow flowing through a low temperature pre-heater toward a boiler, and to produce a quantity of cooled brine, and then injecting the quantity of cooled brine into the third storage zone.

12. The method of claim 11, further comprising flowing a warm fluid leaving a low temperature pre-heater towards a high temperature pre-heater heated with heat, and wherein the heat comprises heat obtained from at least one of:
directly from a solar thermal energy system;
a shallow below-ground energy storage system; and
an above-ground thermal energy storage system;
to produce a flow of hot fluid, and then flowing the hot fluid towards the boiler.

13. The method of claim 2, further comprising:
when energy is needed by an electricity power grid, withdrawing a quantity of high temperature brine from the first storage zone and a quantity of warm brine from the third storage zone; and
using the quantity of high temperature brine and the quantity of warm brine to help power a power generating subsystem, and to produce a quantity of medium high temperature brine and a quantity of cooled brine;
injecting the quantity of medium high temperature brine into the second storage zone; and
injecting the quantity of cooled brine into the third storage zone.

14. The method of claim 13, wherein the withdrawing of the quantity of high temperature brine comprises using at least one huff/puff well in communication with the first storage zone.

15. The method of claim 13, wherein the injecting of the quantity of medium high temperature brine comprises using at least one huff/puff well in communication with the second storage zone.

16. The method of claim 1, wherein the second storage zone at least partially circumscribes the first storage zone.

17. The method of claim 1, further comprising using at least one of the excess energy and the high temperature brine from the first storage zone to help power a first power system forming a low-pressure (LP) steam turbine system.

18. The method of claim 1, further comprising using at least one of the excess energy and the high temperature brine from the first storage zone to power parallel arranged first and second power generating subsystems, wherein:
the first power generating subsystem includes a low-pressure (LP) steam turbine system; and
the second power generating subsystem includes a multi-stage steam turbine system comprised of at least two stages, including a low-pressure (LP) steam turbine coupled to a high-pressure (HP) steam turbine.

19. The method of claim 1, wherein the excess energy is generated using a fossil fuel combustor, wherein a fossil fuel used by the fossil fuel combustor is comprised of at least one of natural gas (NG), coal, and bio-fuel.

20. The method of claim 19, wherein a combustion of the fossil fuel generates $CO_2$, and further comprises a $CO_2$-capture subsystem for capturing the $CO_2$.

21. The method of claim 1, wherein the excess energy comprises heat obtained from at least one of directly from a solar thermal energy system, a shallow below-ground thermal energy storage system, and an above-ground thermal energy storage system.

22. The method of claim 1, wherein the excess energy comprises heat obtained from at least one of:
directly from a thermo-electric power plant,
a shallow below-ground thermal energy storage system; and
an above-ground thermal energy storage system.

23. The method of claim 1, wherein the excess energy comprises heat obtained from at least one of:
an air compression operation;
a $CO_2$ compression operation;
directly from a shallow-below ground thermal energy storage system; and
directly from an above-ground thermal energy storage system.

24. The method of claim 1, wherein the injecting the first new quantity of high temperature brine comprises using at least one huff/puff well in communication with the first storage zone.

25. The method of claim 1, wherein the withdrawing the quantity of medium high temperature brine comprises using at least one huff/puff well in communication with the second storage zone.

26. A method for storing excess energy from at least one energy producing source, as thermal energy using an existing geologic formation, the method comprising:
using a first storage zone formed in the existing geologic formation for storing high temperature brine having a temperature within a first temperature range; and
using a second storage zone formed in the existing geologic formation adjacent the first storage zone for storing medium high temperature brine having a temperature within a second temperature range less than the first temperature range; and
using a third storage zone formed in the existing geologic formation adjacent the second storage zone for storing warm brine having a temperature with a third temperature range less than the second temperature range; and
when the excess energy is available from the energy producing source, withdrawing a quantity of at least one of the warm brine or the medium high temperature brine, and heating the withdrawn quantity of warm brine or the withdrawn quantity of medium high temperature brine using the excess energy to produce a first new quantity of high temperature brine; and injecting the first new quantity of high temperature brine back into the first storage zone; and
using the injection of the first new quantity of high temperature brine to force a quantity of medium high temperature brine present in the first storage zone into the second storage zone, to maintain a desired quantity of high temperature brine in the first storage zone and a desired quantity of medium high temperature brine in the second storage zone.

27. A system for using storing excess energy from an energy producing source, the system comprising:
at least one first well for withdrawing and injecting high temperature brine having a first temperature within a first temperature range into a first geologic storage zone;

at least one second well for withdrawing and injecting medium high temperature brine having a second temperature within a second temperature range less than said first temperature range into a second geologic storage zone adjacent the first geologic storage zone;

a third plurality of wells for withdrawing warm brine and injecting cool and/or warm brine into a third geologic storage zone adjacent the second geologic storage zone, the warm brine and the cool brine having temperatures within a third temperature range less than the second temperature range;

a heat exchanger responsive to an excess energy from the energy producing source which heats a withdrawn quantity of the medium high temperature brine and/or a withdrawn quantity of the warm brine into a new quantity of high temperature brine; and a pump which injects the new quantity of high temperature brine into the first geologic storage zone.

* * * * *